United States Patent
Piszczek et al.

(10) Patent No.: US 9,378,088 B1
(45) Date of Patent: Jun. 28, 2016

(54) METHOD AND SYSTEM FOR RECLAMATION OF DISTRIBUTED DYNAMICALLY GENERATED ERASURE GROUPS FOR DATA MIGRATION BETWEEN HIGH PERFORMANCE COMPUTING ARCHITECTURES AND DATA STORAGE USING NON-DETERMINISTIC DATA ADDRESSING

(71) Applicant: DATADIRECT NETWORKS, INC., Chatsworth, CA (US)

(72) Inventors: Michael J. Piszczek, Laurel, MD (US); Jason M. Cope, Highland, MD (US); Paul J. Nowoczynski, Brooklyn, NY (US); Pavan Kumar Uppu, Woodbine, MD (US)

(73) Assignee: DataDirect Networks, Inc., Chatsworth, CA (US)

( * ) Notice: Subject to any disclaimer, the term of this patent is extended or adjusted under 35 U.S.C. 154(b) by 67 days.

(21) Appl. No.: 14/586,346

(22) Filed: Dec. 30, 2014

(51) Int. Cl.
  *G06F 3/06* (2006.01)
  *G06F 11/10* (2006.01)
  *G06F 17/30* (2006.01)

(52) U.S. Cl.
  CPC .......... *G06F 11/1008* (2013.01); *G06F 3/0619* (2013.01); *G06F 3/0644* (2013.01); *G06F 3/0685* (2013.01); *G06F 17/30194* (2013.01)

(58) Field of Classification Search
  CPC ..................... H04L 12/6418; G06F 17/30194; G06F 3/0644; G06F 3/0619; G06F 3/0685; G06F 11/1008
  See application file for complete search history.

(56) References Cited

U.S. PATENT DOCUMENTS

| | | |
|---|---|---|
| 2009/0077558 A1* | 3/2009 | Arakawa ................. G06F 1/206 718/102 |
| 2014/0108473 A1 | 4/2014 | Nowoczynski |
| 2014/0108707 A1 | 4/2014 | Nowoczynski |
| 2014/0108723 A1 | 4/2014 | Nowoczynski |
| 2014/0108863 A1 | 4/2014 | Nowoczynski |
| 2014/0351300 A1 | 11/2014 | Uppu |

OTHER PUBLICATIONS

Ning Liu, et al., "On the Role of Burst Buffers in Leadership-Class Stoage Systems", Apr. 16-20, 2012, Mass Storage Systems and Technologies (MSST), 2012 IEEE 28th Symposium, pp. 1-11.*

* cited by examiner

Primary Examiner — Albert Decady
Assistant Examiner — Kyle Vallecillo
(74) Attorney, Agent, or Firm — Rosenberg, Klein & Lee

(57) ABSTRACT

The present invention is directed to data migration, and particularly, Parity Group migration, between high performance data generating entities and data storage structure in which distributed NVM arrays are used as a single intermediate logical storage which requires a global registry/addressing capability that facilitates the storage and retrieval of the locality information (metadata) for any given fragment of unstructured data and where Parity Group Identifier and Parity Group Information (PGI) descriptors for the Parity Groups' members tracking, are created and distributed in the intermediate distributed NVM arrays as a part of the non-deterministic data addressing system to ensure coherency and fault tolerance for the data and the metadata. The PGI descriptors act as collection points for state describing the residency and replay status of members of the Parity Groups.

29 Claims, 14 Drawing Sheets

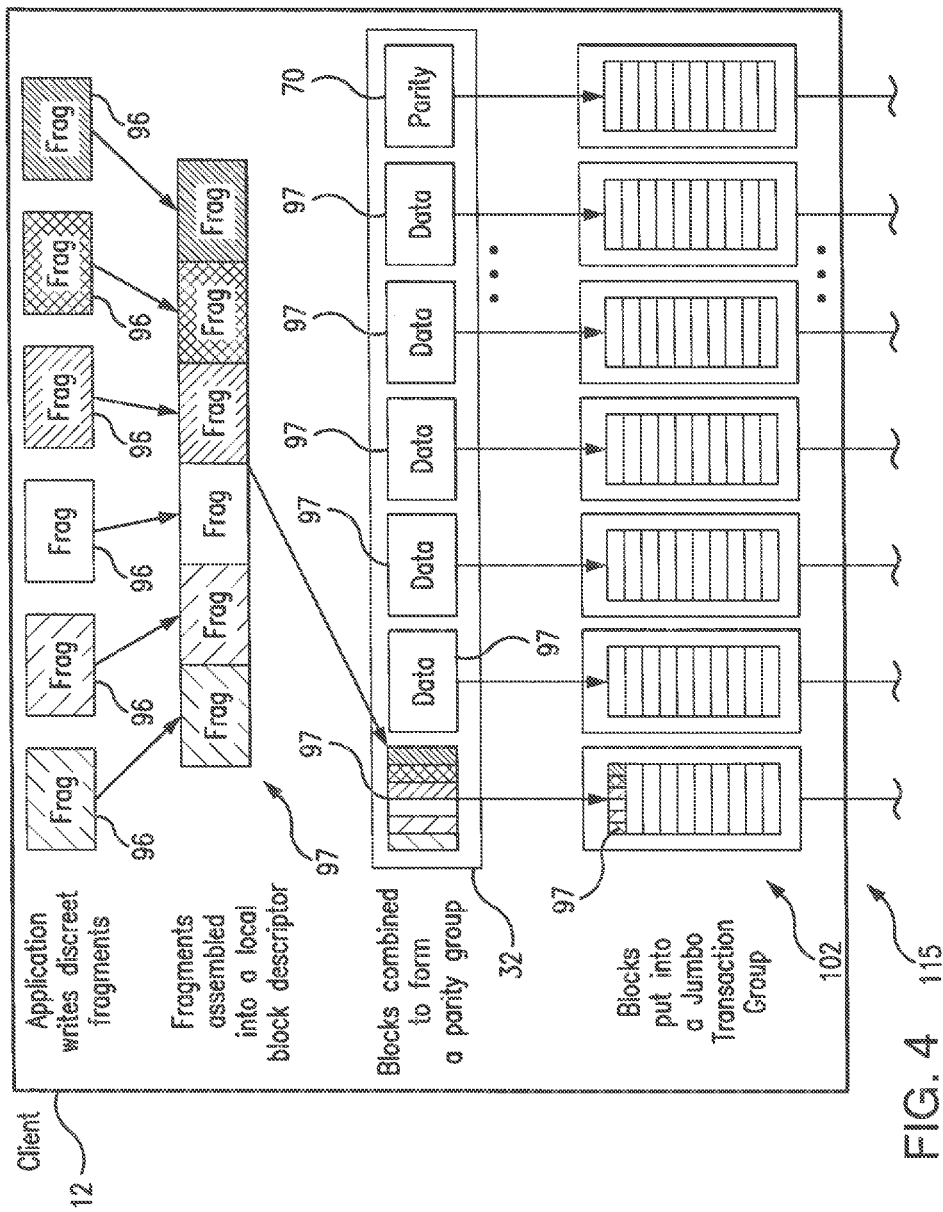

METHOD AND SYSTEM FOR RECLAMATION OF DISTRIBUTED DYNAMICALLY GENERATED ERASURE GROUPS FOR DATA MIGRATION BETWEEN HIGH PERFORMANCE COMPUTING ARCHITECTURES AND DATA STORAGE USING NON-DETERMINISTIC DATA ADDRESSING

FIELD OF THE INVENTION

The present system and method are directed to data migration between high performance computing cluster architectures (also referred to herein as data generating entities, or clients, as well as compute nodes) and long-term data storage, and in particular, to migration of erasure groups, also referred to herein as parity groups, between high performance compute nodes and Backing File System (BFS) in data storage systems.

More in particular, the present system relates to a data migration system employing a Burst Buffer (BB) tier coupled between the data generating entities and the File System to store Parity Group structures in the Burst Buffer tier in a distributed fashion, followed by replay of the Parity Group structures to the Backing File System and post-replay garbage collection.

In overall concept, the present system and method embrace the I/O (Input/Output) activity in a data migration system equipped with an intermediate storage tier supporting a multi-step data migration process beginning with the client's aggregation of dirty buffers and construction of Parity Groups therefrom followed by ingestion of the Parity Groups from the client, i.e., the receipt and temporary storage of the dirty buffers in an unstructured manner in the intermediate storage tier, and subsequent reclamation of the Parity Groups distributed throughout the intermediate storage tier for replaying the temporary stored Parity Groups (and a garbage collection) into a Backing File System for long-term (or permanent) storage in an orderly manner, with ensured fault tolerance for data and metadata, and redundancy for data processing.

In addition, the present system is directed to a data storage system using an Infinite Memory Engine (IME) which is supported by the concept of a Burst Buffer tier, serving as a mediator between high performance computing clients and an existing Parallel File System for long term data storage, in which non-deterministic write methods are combined with inferential data location techniques based on address domains to provide system support for expedited data ingestion into the data storage system combined with a consistent read view of the underlying File System.

Further, the subject system is directed to a data storage system using an intermediate data storage sub-system (BB tier) which exploits a distributed array of Non-Volatile Memory (NVM) devices interconnected via a low-latency infrastructure to enable a fast ingest of Parity Group structures from high performance computers to the NVM devices by storing the data constituting the Parity Group structures in an expedited unstructured manner, and supporting the reclamation of the Parity Group structures for an orderly, germane egress of the data from the distributed NVM array, through the data restructuring aggregation, using the residency and replay status information for the Parity Group structures, to a long-term (or permanent) data storage where it resides in a highly structured format.

The subject system further constitutes a non-deterministic data addressing system, in which the use of distributed NVM arrays as a single intermediate logical storage requires a global addressing capability that facilitates the storage and retrieval (reclamation) of the locality (residency) information (metadata) for any given fragment of unstructured data in Parity Group structures, where Parity Group Information (PGI) descriptors are created and distributed in the Infinite Memory Engine (IME) supported by the non-deterministic data addressing system, to ensure coherency and fault tolerance for the data and the metadata, and where the PGI descriptors act as collection points for state describing the residency and replay status of Parity Group structures.

BACKGROUND OF THE INVENTION

Storage information in a high performance computing environment presents certain challenges and requires data storage architecture and data migration procedures permitting a high level of efficiency and fault tolerance for the data migrating between the high performance computers and long-term (or permanent) data storage.

Data storage architectures handling high performance computations have been developed, including those described in U.S. Patent Application Publication No. 2014/0108723, filed as a Ser. No. 14/056,265, directed to "Reducing Metadata in a Write-Anywhere Storage Sub-System"; U.S. Patent Application Publication #2014/0108473, filed as a Ser. No. 14/050,156, directed to "Maintaining Order and Fault-Tolerance in a Distributed Hash Table System"; U.S. Patent Application Publication #2014/0108863, filed as a Ser. No. 14/035,913, describing "Handling Failed Transaction Peers in a Distributed Hash Table"; U.S. Patent Application Publication #2014/0108707, filed as a Ser. No. 14/028,292, related to "Data Storage Architecture and System for High Performance Computing"; and patent application Ser. No. 14/045,170, directed to "Method and System for Data Transfer between Compute Clusters and File System".

All these architectures use distributed data storage and a specific addressing system capable of pointing a request (when a file access is requested) to a particular location (or locations) within a group of distributed memories.

For example, a data storage architecture and system for high performance computing (described in the U.S. patent application Ser. No. 14/028,292, filed on 16 Sep. 2013) includes an intermediate storage tier interconnected between a super computer and a primary storage to temporarily store data from the compute nodes of the super computer in the intermediate storage tier.

The intermediate storage is built with Non-Volatile Memory (NVM) units which store data items generated by the compute nodes. The intermediate storage employs Input/Output (I/O) nodes to maintain information on the data items residency in the Non-Volatile Memory units via a hash table distributed among the I/O nodes. The use of a Distributed Hash Table (DHT) allows for quick access to data items stored in the Non-Volatile Memory units.

Although mentioning the possibility of storing Parity Group Information (PGI) in the DHT, neither the Parity Groups migration process between the high performance compute nodes and the permanent storage, nor creation and distribution of the Parity Group Information (PGI) descriptors for non-deterministic data addressing, nor reclamation process supported by the PGI descriptors for data migration from the intermediate storage to the backing file system have been addressed in the prior data storage architectures.

SUMMARY OF THE INVENTION

It is therefore an object of the subject system and method to provide a data storage architecture and a data migration process using an intermediate storage tier operatively coupled between high performance computers and a long-term (or permanent) data storage and permitting fast ingress of unstructured data, built into a Parity Group Structure, from the high performance compute nodes into Non-Volatile Memory (NVM) units in the intermediate storage tier in a distributed manner, and, reclamation of the ingested unstructured data, providing for an orderly egress of the data from the distributed NVM arrays in the intermediate storage tier to the Backing File System, and further to the permanent storage for residing there in a highly structured format.

It is another object of the subject system and method to provide data storage architecture which uses a distributed intermediate storage sub-system, such as a Burst Buffer (BB) tier, between the unstructured ingress of data from high performance computers and orderly egress of that data into the permanent storage. This system provides a Parity Group (PG) structure which is constructed by a compute node and ingested into a group of I/O nodes (or I/O servers) constituting a local storage pool within the BB tier (although the fragments of the unstructured data in the PG structure may belong to a file which represents a global object, i.e., spanning over the nodes beyond a local pool nodes), and where a non-deterministic data addressing of the Parity Group is performed through construction and distribution of Parity Group Information (PGI) structures which are used to track members of the Parity Group distributed among the I/O servers in the BB tier.

It is also an object of the present invention to provide a process of reclamation of distributed erasure (parity) groups in a non-deterministic data addressing Infinite Memory Engine (IME) system supported by the Parity Group Information (PGI) descriptors, and specifically, the reclamation of the PGIs and their resources in the IME system to ensure coherency and fault tolerance for the data and the metadata, where the PGI descriptors act as collection points for a state describing the residency and replay status of Parity Group structures.

It is an additional object of the subject concept to provide a data storage system and method for data migration between high performance computing clusters and permanent storage in the most efficient manner by employing an intermediate burst buffer tier composed of NVM arrays and Distributed Hash Table (DHT), where each data block, as well as each parity block (also referred to herein as RAID block) included in a Parity Group, is consumed by a different I/O server in a single local storage pool composed of the I/O servers (and associated NVMs) for handling a specific Parity Group stored in a respective pool of NVMs. Pool-local PGI descriptors are created and distributed for handling the Parity Group in question, to act as collection points describing the residency and replay status of the Parity Group.

In one aspect, the concept embraces a method for data migration between data generating entities and a Backing (for example, Parallel) File System in a data storage system composed of a Burst Buffer (BB) tier operatively coupled between at least one data generating entity and the Backing File System, and configured with a plurality of Burst Buffer Nodes (BBNs) and arrays of Non-Volatile Memory (NVM) units operatively associated with respective BBNs. The plurality of BBNs are arranged in a number of storage pools.

The subject method is carried out through the steps of:
composing, by at least one data generating entity, at least one Parity Group structure containing a plurality of data blocks $BBB_1$, $BBB_2$, ..., and $BBB_n$, and at least one parity block $BBB_p$. Each of the plurality of data blocks is filled with respective unstructured data fragments and a metadata section addressing the unstructured data fragments. The parity block contains error correction coded respective data fragments and metadata.

The Parity Group structure is stored in a respective one of the plurality of storage pools residing in the BB tier. The storage pool in question is configured with the $BBN_S$ where the data blocks $BBB_1$, $BBB_2$, ..., $BBB_n$, and at least one parity block $BBB_p$ are stored.

One of the plurality of BBNs in the respective storage pool, generates a Parity Group Identifier (PGID) for at least one Parity Group structure and a Parity Group Information (PGI) structure for at least one Parity Group. The PGID includes information on the PGI's residency in the BB tier, and the PGI structure includes information addressing each of the data and parity blocks in the respective storage pool.

In a replay phase of operation, at least one data fragment is replayed from the respective storage pool to the File System by an assigned BB node residing in the respective storage pool through the operations of:

determining, using the PGID and the PGI structure, whether the data fragment in question resides at an NVM unit local to the assigned BBN, and reading the data fragment from the local NVM unit, for subsequent validation and transmission to the BFS.

If, however, the data fragment of interest resides at a BBN other than the assigned BBN, the assigned BBN sends a message to the other BBN, thus requesting the data fragment therefrom. If the other BBN is available, the method proceeds by fetching at least one fragment from the NVM unit local to the other BBN, validating the data fragment, and writing the data fragment to the File System.

The subject method further performs the operations of:
subsequent to the data fragment being written into the File System, sending a replay completion instruction for the data fragment to an authoritative node holding the PGI structure, and decrementing, by the authoritative node, a reference count for the PGI. When the decremented reference count reaches zero, a garbage collection procedure is performed.

If, however, the other BBN is not available, the data fragment is reconstructed using bulk data and parity data of the Parity Group structure striped across the BBNs located in the storage pool using the PGI in question.

The subject method is enhanced by coupling a Residency Reference Counts Structure to the BB tier to indicate the number of active references to DHT objects in the BBNs, and decrementing the Residency Reference Counts Structure for the data fragment replayed from the BB tier to the File System.

The Residency Reference Counts Structure is configured with a Local Object Counter for counting residency references to data fragments local to BBNs in the respective storage pool, a Pool-Local Object Counter for counting residency references to objects local to the respective storage pools, and a Pool-Global Object Counter for counting residency references to files (objects) global to the plurality of storage pools in the BB tier.

The Pool-Local Object Counter may be configured as a bitmap, with each bit representing one of the BBNs holding the Parity Group structure. During the replay operation, upon replaying data fragments, the Local (Node-Local) Object Counter is decremented until the residency reference count of the data fragments for a respective data block of the Parity Group reaches zero, which means that the respective data block is replayed to the File System. Subsequently, a residency reference bit associated with the respective data block in the Pool-Local Object Counter's bitmap is cleared.

The Pool-Global Object Counter is configured with a Bit Field, with each bit representing one of the storage pools in the BB tier. During the replay operation, upon replaying the respective data block to the File System, the Pool-Local Object Counter decrements the counts until the residency reference count of the blocks $BBB_0$, $BBB_1$, ..., and $BBB_n$, and $BBB_p$ for the respective storage pool reaches zero, meaning that the Parity Group is replayed to the File System. When the Residency Reference Counts Structure reaches zero for all blocks $BBB_1$, $BBB_2$, ..., $BBB_n$, and $BBB_p$ of the Parity Group, the PGI is deleted from said BBNs. Subsequently, a residency reference bit associated with the respective pool in the Pool-Global Object Counter's Bit Field is cleared.

When the Residency Reference Counts Structure reaches zero for the plurality of storage pools in the BB tier, the Pool-Global Object is unreferenced.

During the Replay phase of data migration from the data generating entities to the File System, at least one BBN acquires the metadata stored in the DHT server portion associated with the BBN in question, and data fragments are read from a respective block written in this BBN. Subsequently, the data fragments are aggregated and are stored in a respective buffer (or file) in a structured format in accordance with the respective metadata to form a node-local object (file), or a pool-local object (file), or a pool-global object (file). Once the respective buffer (containing an object of interest) is full, the structured data fragments are committed to the File System.

If during the replay of the data fragment, the data migration process experiences a faulty condition, the system uses the PGI to indicate the Parity Group's blocks needed for data reconstruction, i.e., the data blocks and at least one parity block of the Parity Group is maintained in the PGI structure The subject method further performs garbage collection procedure on the basis of the Parity Group structure using the residency state and the replay status of the data fragments.

Further, during the Replay Phase, the following sequence of operations is performed:

Reading (by an authoritative node in the respective storage pool) a list of BBNs holding the Parity Group structure's bulk data and parity data, Sending (by the authoritative node) a PGI deallocate message to BBNs in the respective pool other than the authoritative BBN, upon receipt of the PGI deallocate message, removing the PGI descriptor from the DHT server, removing, by the other node, the data fragments list from the PGI with subsequent removal of the data fragments from the DHT server, and freeing the memory space in the NVM associated with the other node.

The Replay Phase continues by the operations of:

removing the data fragments and the PGI remaining in the authoritative node from the DHT server, and removing the bulk data from the NVM unit associated with the authoritative node.

The subject method further is configured for carrying out a "Client Read" procedure through the steps of:

finding, by the client (data generating entity), an authoritative node for a requested data, and issuing a READ request from the client to the authoritative node, subsequently, at the authoritative node, checking if the requested data is local to the authoritative node, and if the requested data is local to the authoritative node, fetching the requested data from the NVM unit local thereto, followed by validating the fetched data, and returning the requested data to the client.

If, however, it is determined that the requested data is held in another node (not in the authoritative node), the authoritative node sends the message to the another node for the requested data and waits for the requested data.

Upon receipt of the requested data from the another node, the authoritative node determines if the requested data received from the another node is valid, and if valid, returns the requested data to the client.

If it is determined that the data is invalid or the another node is unavailable, the method proceeds through the operations of:

Reading (by the authoritative node) the PGI data, and obtaining therefrom a list of BBNs containing the bulk data and parity data of the Parity Group, reading the bulk data and parity data from the BBNs, using the erasure coding information from the PGI to reconstruct the invalid requested data, and returning the reconstructed requested data to the client.

In another aspect, the subject concept is directed to a data migration system which includes:

a Burst Buffer (BB) tier operatively coupled between a data generating entity and the File System, and configured with a plurality of Burst Buffer Nodes (BBNs) and a plurality of Non-Volatile Memory (NVM) units. Each NVM unit is operatively associated with a respective BBN. The plurality of BBNs are arranged in a plurality of storage pools. The data generating entity is configured to compose at least one Parity Group to be ingested in a respective one of the plurality of storage pools in the BB tier.

The system further includes a Parity Group Replay Engine operatively coupled between the BB tier and the File System, and an Addressing Mechanism operatively coupled to the data generating entity, the BB tier, the Parity Group Ingestion mechanism, the Parity Group Replay Engine, and the File System.

The Parity Group includes a plurality of data blocks $BBB_1$, $BBB_2$, ..., $BBB_n$. Each of the data blocks $BBB_1$, $BBB_2$, ..., $BBB_n$, is filled with corresponding unstructured data fragments and contains metadata associated with the corresponding data fragments, and at least one parity block $BBB_p$ containing error correction coded data fragments contained in the data blocks $BBB_1$, $BBB_2$, ..., and $BBB_n$. The data blocks $BBB_1$, $BBB_2$, ..., $BBB_2$, and $BBB_p$ share the respective storage pool affinity.

The Parity Group Ingestion mechanism is configured to operatively cooperate with the Addressing mechanism to generate a Parity Group Information (PGI) containing information for the Parity Group residency and replay status, and a Parity Group Identifier (PGID) containing information on a residency of the PGI structure.

A Distributed Hash Table (DHT) server is operatively coupled to the BB tier. The DHT server includes a plurality of DHT portions, with each DHT portion being maintained by a respective one of the plurality of BBNs.

The Parity Group Replay Engine is configured to acquire (during a Replay Phase of operation) metadata stored in the corresponding DHT portion associated with the at least one BBN, to read the data fragments from the block written in at least one BBN, to store the data fragments in a respective buffer in a structured format in accordance with the metadata, and to write the structured data fragments in the File System, once the respective buffer is full. During the Replay Phase of operation, the subject system uses the PGI to indicate the Parity Group's blocks needed for data reconstruction if data migration experiences faulty conditions.

The subject system further includes a Residency Reference Counts Structure coupled to the BB tier to indicate the number of active references to the at least one DHT object. The Residency Reference Counts Structure is configured to cooperate with the Parity Group Replay Engine for decrement count for the data fragments removed from the corresponding block during the Replay operation.

The Residency Reference Counts Structure is configured with a Node-Local Object Counter, a Pool-Local Object Counter, and a Pool-Global Object Counter. The Local Object Counter transmits to the Pool-Local Object Counter the counts changes for references to objects local to the BBNs. The Pool-Local Object Counter is preferably configured as a bitmap with each bit representing one of the blocks in the Parity Group. The Pool-Local Object Counter reports to the Pool-Global Object Counter the counts changes for references to objects local to a respective pool. The Pool-Global Object Counter is preferably configured as a bit field with each bit corresponding to one of a plurality of storage pool in the BB tier.

The Residency Reference Count Structure is configured to cooperate with the Parity Group Replay Engine to decrement count till the reference count for the block of the Parity Group reaches zero, and to clear the residency reference bit associated with the Parity Group in said PGI's bitmap. The PGI is deleted from the BBNs when the residency reference counts reach zero for all the blocks, $BBB_1$, $BBB_2$, ..., $BBB_n$, and $BBB_p$ of the Parity Group.

These objects and advantages of the present invention will become apparent when considered in view of further detailed description accompanying the Patent Drawings.

DETAILED DESCRIPTION OF THE PREFERRED EMBODIMENT

The present system's operation is based on an Infinite Memory Engine (IME) concept which aims to integrate Non-Volatile Memory (NVM) into the parallel storage stratum. A Burst Buffer (BB) tier in the subject system serves as a mediator between HPC (High Performance Computers (clients) and existing parallel file systems for long-term data storage. The IME combines non-deterministic write methods with inferential data location techniques based on address domains. By using these techniques in a cooperative manner, a data storage system support is provided for extremely fast data ingestion into a set of I/O nodes within the BB tier while supporting a consistent "read" view of the entire underlying file system.

As a technology, the IME exploits a large array of NVM devices which are connected via a low-latency infrastructure for enabling fast ingest of data to NVM arrays by allowing the data to be stored in the NVM arrays in an unstructured manner, and allowing the system to provide an orderly, germane egress of the data from the distributed NVM arrays to a "permanent" (or long-term) storage, where the data resides in a highly structured format.

Figure 1:
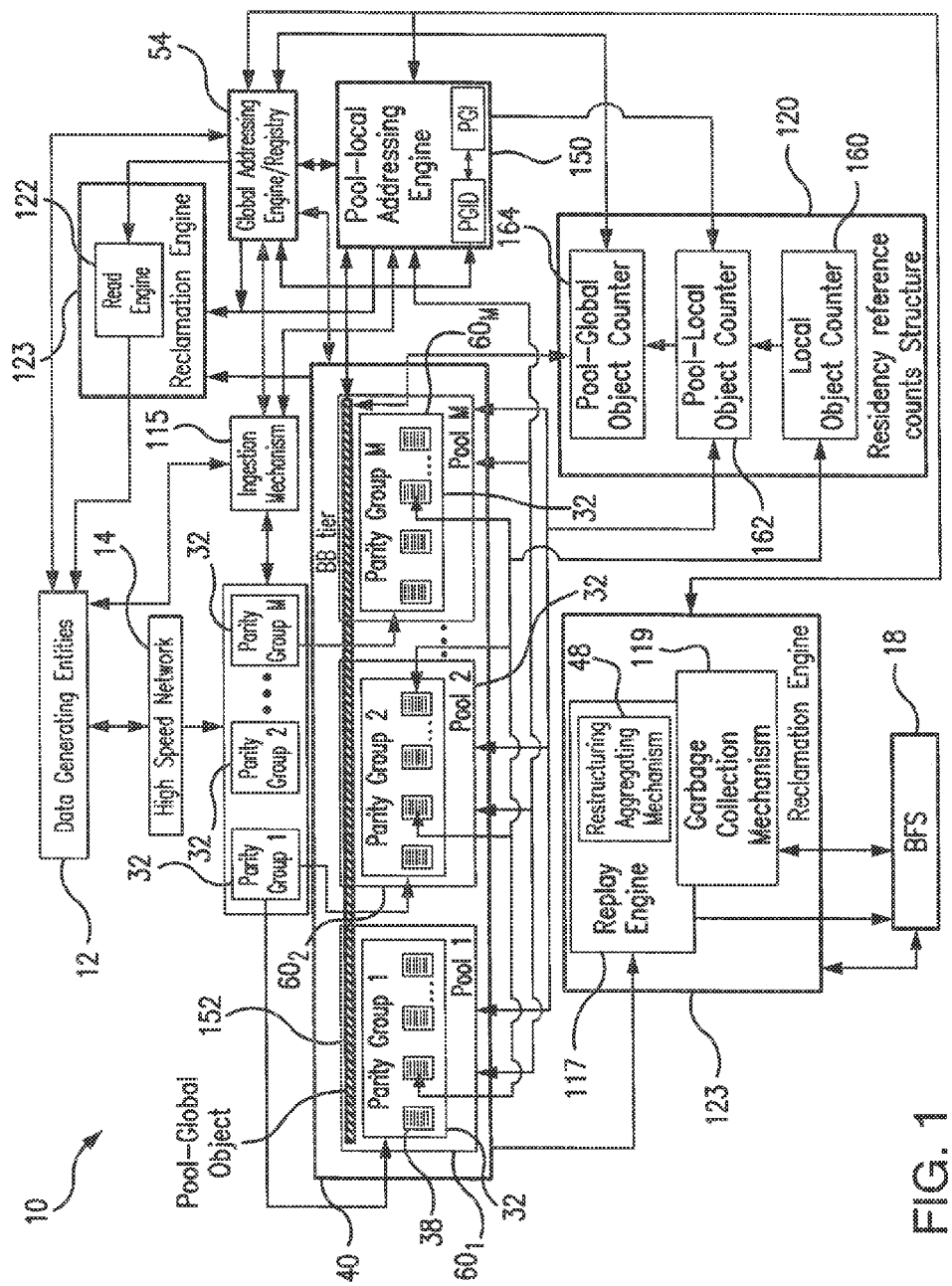
FIG. 1 is a schematic representation of the subject system data migration between data generation entities and the Backing File System.
Figure 2:
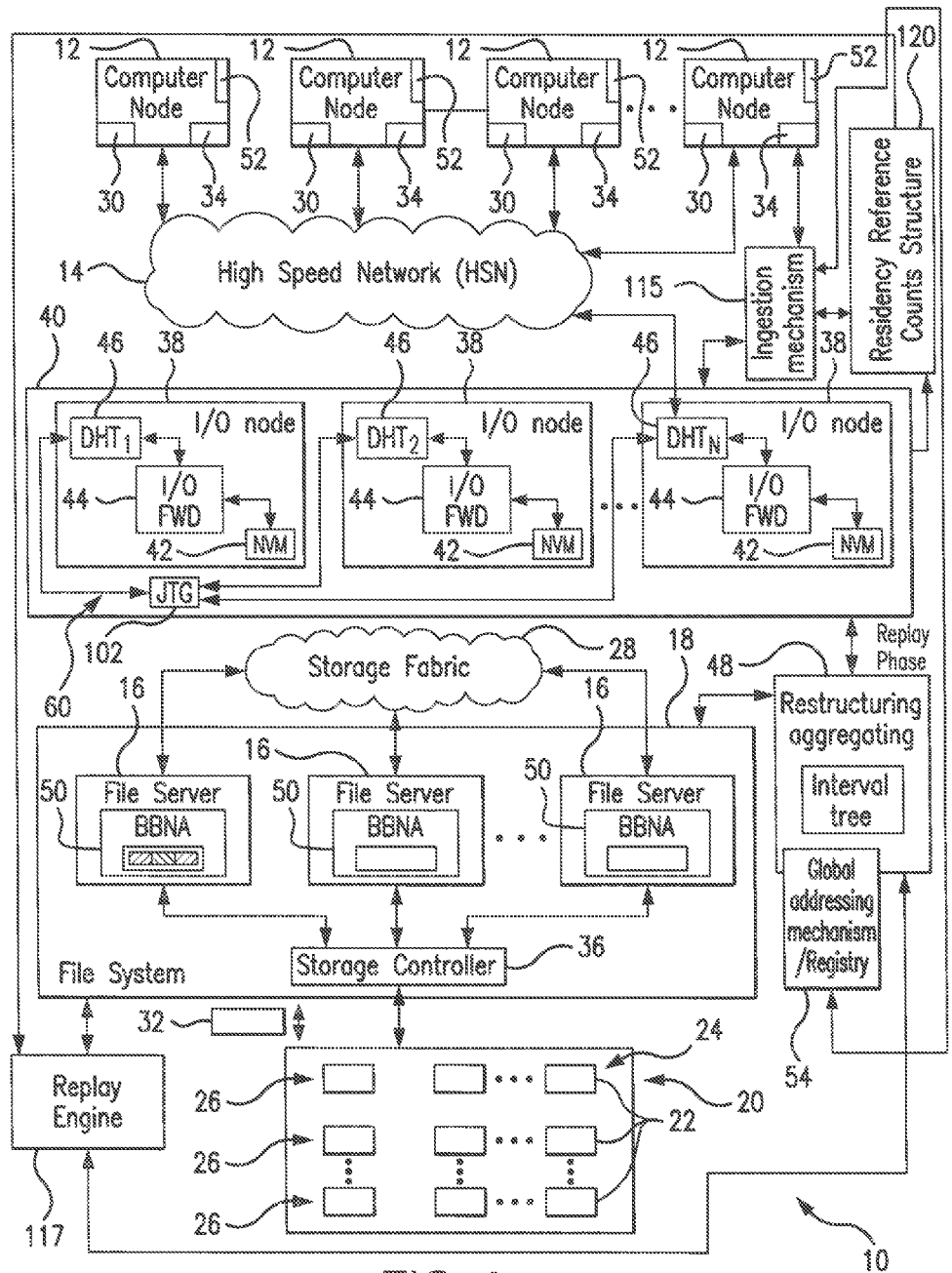
FIG. 2 represents a block diagram of the subject data storage system with one storage pool.

Specifically, referring to FIGS. 1 and 2, the data migration system 10 of the present invention includes a number of compute nodes 12. The compute nodes may be arranged in computing groups (or compute clusters) to perform complex computations of various types. The operation of the compute nodes depends on the system application. They may function as servers, supercomputing clusters, etc., and have the capacity to "write" by outputting data to, as well as "read" data from, an external memory, or any other storage device. In the present description, the above presented devices may also be intermittently referenced further as data generating entities, or computing architectures, as well as clients, or hosts.

The compute nodes (or data generating entities) 12 are operatively connected through a High Speed Network (HSN) 14 to File Servers 16 which constitute a portion of the Backing File System (BFS) 18, and are configured to manage data migration from and to the compute nodes 12. The File Servers 16 may communicate through a Storage Fabric 28. The ratio of the compute nodes 12 to the File Servers 16 may in some cases be greater than 1,000. The High Speed Network (HSN) 14 functions as a high speed switch, and may be based on any of the network transport protocols, such as, for example, InfiniBand (IB), Fibre Channel (FC), Gigabit Ethernet (GigE), etc.

During the input/output (I/O) cycle of the compute node's operation, the data may be transferred from the compute node's cache to the File Servers 16 which may place data in the Backing File System 18 for subsequent retrieval. Also, during the I/O cycle of the compute node's operation, the client may request to "read" data.

As shown in FIG. 2, data retrieved from compute nodes 12, and/or File Servers 16, are intended to be written into the File System 18, and stored in a primary storage sub-system 20 which typically includes data storage devices 22 in the form of Hard Disk Drives (HDDs), Solid-State Drives (SSDs), flash memory devices, magnetic tapes, or other storage media. For the sake of simplicity, and only as an example, the storage devices 22 will be referred to as disk drives, although any other storage media may operate as the primary storage sub-system 20.

The data storage devices 22 may be arranged according to any of a variety of techniques, and in any format, for example, as storage disk arrays 24. For example, the storage disk arrays may be arranged in the RAID (Redundant Array of Independent Drives) format. The RAID storage system is a multi-dimensional array 24 of disk drives (or flash memory devices) 22 distributed in READ/WRITE tier groups 26 for storing data D and parity values P corresponding to data stored in the array 24. Each tier group 26 in the array of data storage devices 22 constitutes a multiplicity of data storage channels.

A storage controller 36 controls the operation of the data storage devices 22 in their respective arrays 24. In the present system, the data storage devices 22 are preferably accessed in an optimally sequential (orderly) manner for disk drive exploitation, or in another efficient manner providing the uncompromised I/O performance of a storage controller 36 of the storage disk array 24.

Data storage devices 22 are provided with the capability of receiving data in the most efficient manner so that the system 10 avoids the need for an excessive number of data storage devices for storing the parity group data. Thus, the storage devices which do not participate in data transfer, may stay deactivated, as controlled by the storage controller 36 for the period they are not accessed. This avoids excessive power consumption of the storage disk arrays.

Figure 3A:
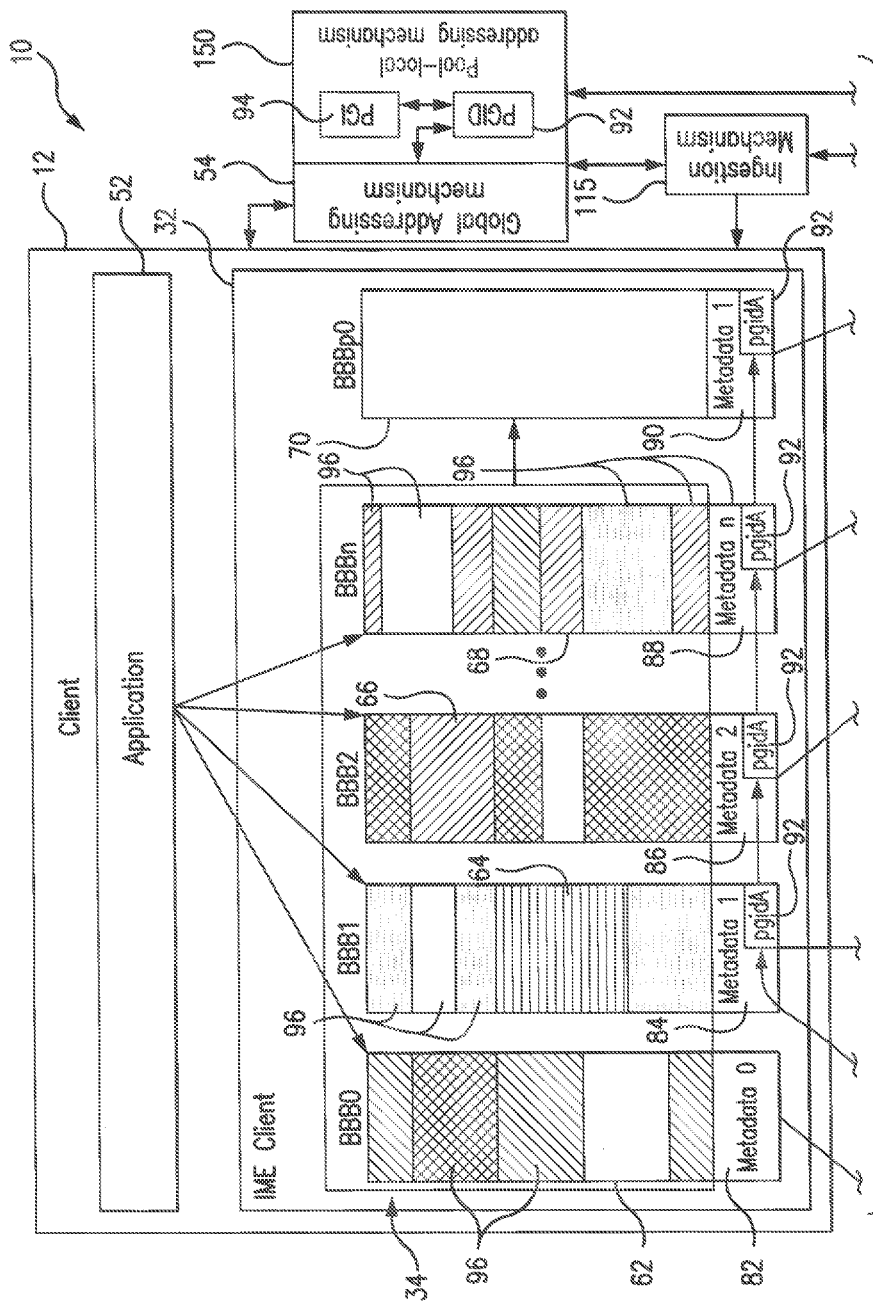
FIGS. 3A-3B represent the process of construction the Parity Group followed by the Ingestion of the Parity Group in a storage pool in the BB tier.
Figure 3B:
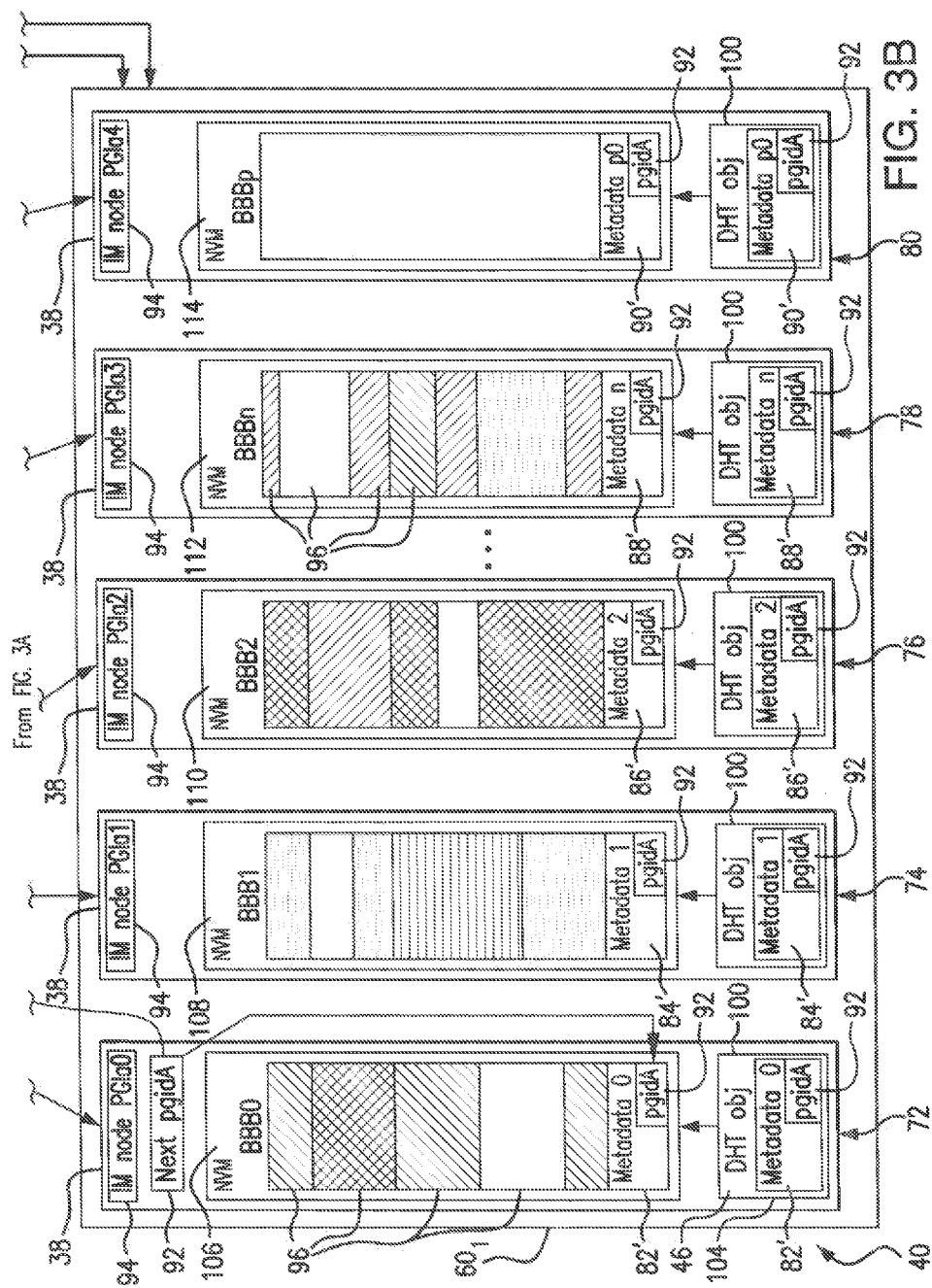

Each compute node 12 is equipped with a software unit 30 which controls the operation of the compute node for the intended purposes and, as an example, is configured for construction of a Parity Group 32, as presented in FIGS. 3A-3B, and detailed in following paragraphs.

In addition, each compute node (or client) 12 is equipped with a write-back cache 34 configured for construction and migration of the Parity Group 32 as will be detailed infra.

Returning to FIGS. 1 and 2, connected between the High Speed Network 14 and the File Servers 16 are I/O nodes 38 (also referred to herein as I/O servers) which serve as an interface and render communication between the compute nodes 12, High Speed Network 14, and the File Servers 16 using a number of data transfer protocols (for example IB, FC, GigE, etc.), as needed by the system. The I/O nodes 38 are adapted for interfacing with the File Servers 16, as well as with the Backing File System 18 in its entirety.

The capability of storing the data in an expedited and efficient manner is provided by utilizing a tier of storage hardware, also referred to herein as a Burst Buffer (BB) tier 40. The BB tier 40 is based on Non-Volatile Memory (NVM) technology which is operatively coupled between the compute nodes 12 and the File System 18. The BB tier 40, also referred to herein as an intermediate storage sub-system, includes a number of NVM units 42. Each NVM unit 42 augments a respective I/O node 38 operatively coupled to an I/O Forwarding Software 44 in the I/O nodes 38.

Each I/O node 38 (also referred to herein as Burst Buffer Nodes (BBNs)), is a server which acts as a temporary and fast store for data. Generally speaking, each burst buffer node (BBN) is a member of a set which cooperate one with another to provide high performance and reliability. The plurality of I/O nodes 38 in the BB tier 40 are arranged into a plurality of storage pools $60_1$, $60_2$, ..., $60_M$, as shown in FIG. 2. The I/O nodes 38 in the same pool share the pool affinity.

As shown in FIG. 2, each I/O node 38 has a portion of a Distributed Hash Table (DHT) server 46 included therein. $DHT_1$, $DHT_2$, ..., $DHT_N$ are the portions of the DHT server maintained by the I/O nodes 38 of the BB tier 40.

A Distributed Hash Table (DHT) is a class of a decentralized distributed system that provides a lookup service similar to a hash table in which "key, value pairs" are stored in a DHT server. Any participating node can efficiently retrieve the value associated with a given key. Responsibility for maintaining the mapping from keys to values is distributed among the nodes, in such a way that any change in the set of participants causes a minimal amount of disruption. This allows the DHT to be scaled to extremely large numbers of nodes and to handle continual node arrivals, departures, and failures.

A foundation of the DHT represents an abstract keyspace. A keyspace partitioning scheme splits ownership of the keyspace among the participating nodes. An overlay network then connects the nodes, allowing them to find the owner of any given key in the keyspace. Consistent hashing provides that a removal or an addition of one node changes only the set of keys owned by the nodes with adjacent IDs, and leaves all other nodes unaffected.

The DHT 46 in the subject system 10 is primarily used to maintain location information for stored data items, also referred to herein as Unstructured Layout Metadata (ULM) for data fragments of the parity groups written by the compute nodes 12 in the BB tier 40, as will be detailed in further paragraphs. The ULM refers to the layout information of a Parallel File System whose contents may be arbitrarily distributed among the storage elements. The DHT 46 may also store Parity Group Information (PGI), data item (or file) attributes, file replay status, and other information about the stored data item, as will be detailed in further paragraphs.

The present system 10 provides the data movement from the BB tier 40 into the Backing File System 18 in a highly efficient manner while servicing "WRITE" requests. Similarly, when servicing "READ" requests, data migrates from the file system 18 into the requesting compute node(s) 12 in an efficient manner due to the usage of the intermediate data storage sub-system 40 (or BB tier).

The process of handling "WRITE" requests in the IME system 10 may be divided into three phases, including I/O Ingestion phase supported by Ingestion Mechanism 115, Replay into the Backing File system, supported by the Replay Engine 117, and post-replay garbage collection phase supported by the garbage-collection mechanism 119. These three phases are operatively interconnected, however, each of them uses a set of specific transactional instructions unique to their respective phase.

The subject system 10 is capable of handling any type of data transfer including "writes", and "reads" alike. As an example, the following description of the system operation will be detailed with the specifics of the Reclamation of the Parity Group structures subsequent to the Ingestion phase of operation for the Replay and the post-replay garbage collection. The subject scheme uses the Parity Group Information (PGI) created and distributed among the I/O nodes 38 of the BB tier 40 during the Ingestion phase of operation and serving as part of the addressing mechanism supporting the Reclamation scheme 123, as will be detailed further herein.

The process of handling "READ" requests supported by the Read Engine 121 also uses the Parity Groups in reclamation scheme 123 as will be detailed infra.

Applications 52 running on compute nodes 12 facilitate the mitigation of the Parity Group to the Burst Buffer tier 40 instead of writing the Parity Group directly into the File System 18. The input performance of the NVM unit 42 is at least one order of magnitude faster than the input activity of HDD-based Parallel File System. Thus, the increase in I/O speed permits the applications to complete their calculating activity in an expedited fashion.

Fast ingest is crucial for enabling an application's check pointing and restart which has been a signature problem in high-performance computing for several decades. However, dealing with unstructured data is an expensive operation. Over time, it is not economical to maintain data in this manner, due to the metadata overhead expense. Therefore, the system 10 must restructure the ingested data stored in the NVMs 42 in the BB tier 40 at some later time.

Each Parity Group 32 resident in the Burst Buffer tier 40 is moved into the Parallel File System 18 at some point to make room for a next Parity Group to transfer to the Burst Buffer tier 40 from a compute node. This is preferably carried out during the Replay Phase of operation for which the present system is provided with a Restructuring Aggregation Mechanism 48 which allows for the migration of seemingly random or unrelated data fragments from any single storage element (i.e., NVM 42 in the BB tier 40) to the Backing File System 18.

Preferably, the restructuring operation occurs as part of the data migration process as data is moved from the NVMs 42 to the HDDs 22. The storage elements participating in this process may be called the restructuring aggregators since they are responsible for the ingestion of highly entropic data streams and the output of large structured segments. As part of the restricting aggregation, a software based unit, referred to herein as Burst Buffer Network Aggregator 50 (or BBNA), is included in the system. The BBNA 50 may run either on File Servers 16 or alternatively on the Parallel File System I/O nodes. The BBNA unit 50, shown in FIG. 2, is a part of the subject erasure groups Reclamation Scheme 123. The BBNA unit 50 is configured to coalesce the data fragments that are germane to the Parallel File System 18.

NVMs 42 are well suited for handling unstructured data, because of their high efficient random access properties. Additionally, as low latency interconnects become more commonplace, the boundaries between storage, network, and compute will become more opaque. This will enable the efficient interconnection of hosts' (clients') storage devices. However, the use of the distributed NVM arrays as a single logical store in the subject system requires a global registry capability that can store and retrieve the locality information (metadata) for any given segment of unstructured data to facilitate and support erasure groups reclamation when needed. The present system provides means for the global registration of the locality information in a fully parallel and fault tolerant manner, as will be detailed infra.

A Global Addressing Mechanism (or Engine) 54, also referred to herein as Global Registry, is included in the subject system with the purpose of using highly interconnected NVM devices 42 as part of the restructuring aggregating mechanism 48 and to support the Replay Phase, Garbage Collection Phase, as well are Client Read Node of operation. Using the Global registry mechanism 54, the NVM storage tier 40 may be used in the present system 10 as a high performance buffer between two parties which are largely at odds with one another, i.e., applications 52 which do not have to be aware of the I/O alignment properties of the storage stack 40 and the HDD-based Parallel File Systems 18 that require highly structured data streams to achieve reasonable performance.

A Pool-Local Addressing Engine 150 (shown in FIGS. 1 and 3A) is included into the subject system to support the capability of the IME system to track data distributed in each storage pool, as will be presented in the following paragraphs.

The Pool-Local Addressing Engine 150 is operatively interconnected with the Global Addressing Engine 54 to track the migration of the data of interest throughout the entire system, without being limited to a single storage pool.

During the Ingestion phase, the present system addresses creation of Parity Group Information (PGI) descriptors. PGI may be considered as the metadata associated with a particular Parity Group structure. PGIs include the set of extents from each burst buffer block of the Parity Group structure and each BBN in the BB tier. Once built by a client, a PGI is immutable and therefore may be easily replicated to multiply BBNs for resiliency. PGIs may be used to track members of a parity group and maintain state regarding the post-replay garbage collection.

Specifically, the present system creates and distributes the PGIs in the Infinite Memory Engine (IME) to ensure coherency and fault tolerance for the data and the metadata in the non-deterministic data addressing system (which is the part of the Global Registry mechanism 54 and Pool-Local Addressing Engine 150). PGIs act as collection points for state describing the residency and replay status of Parity Groups structures, as will be detailed in following paragraphs.

As shown schematically in FIG. 1, performing I/O in the IME based subject system 10 is a multi-step process starting with the client's aggregation of dirty buffers used to construct Parity Groups (Parity Group 1, Parity Group 2, . . . , Parity Group M). This is followed by the receipt and ingestion (through the Ingestion Mechanism 115) of those buffers by the I/O servers 38 in the BB tier 40 (with the Parity Group 1 ingested in the Pool $60_1$, Parity Group 2 ingested in the Pool $60_2$, . . . , and Parity Group M ingested in the Pool $60_M$), and subsequently followed by the replay phase, supported by the Replay Engine 117 during which the Data in the Parity Groups are restructured and aggregated (as supported by the Restructured Aggregating Mechanism 48) into structured files which are subsequently written onto the Backing File System 18. In this context, the Backing File System is the storage system for which burst buffer capabilities are provided. Commonly, this may be a Parallel File System such as Lustre, PanFS, or GPFS. Along the way, the IME ensures fault tolerance for data and metadata in addition to redundancy for data processing.

An important phase in the multi-step I/O process is a garbage collection process (supported by the garbage collection mechanism 119) which is performed after the aggregated structured data is stored in the BFS 18.

The system can garbage collect data that is no longer needed. Before being garbage collected, the data must be either replayed to the BFS, overwritten by new data fragments, or discarded by the user through a "delete" routine.

Alternatively, if the policy is in effect to keep the replayed data in the BB tier 40 as a "read cache", then the corresponding PGI is deallocated along with the parity data for this PGI, and the data fragments in the Parity Group are marked as no longer required to flush. The remaining "read cache" fragments may be garbage collected as needed. If a "read cache" fragment is corrupted, then the data (which was pre sequentially replayed in the BFS) is read from the BFS.

Figure 4:
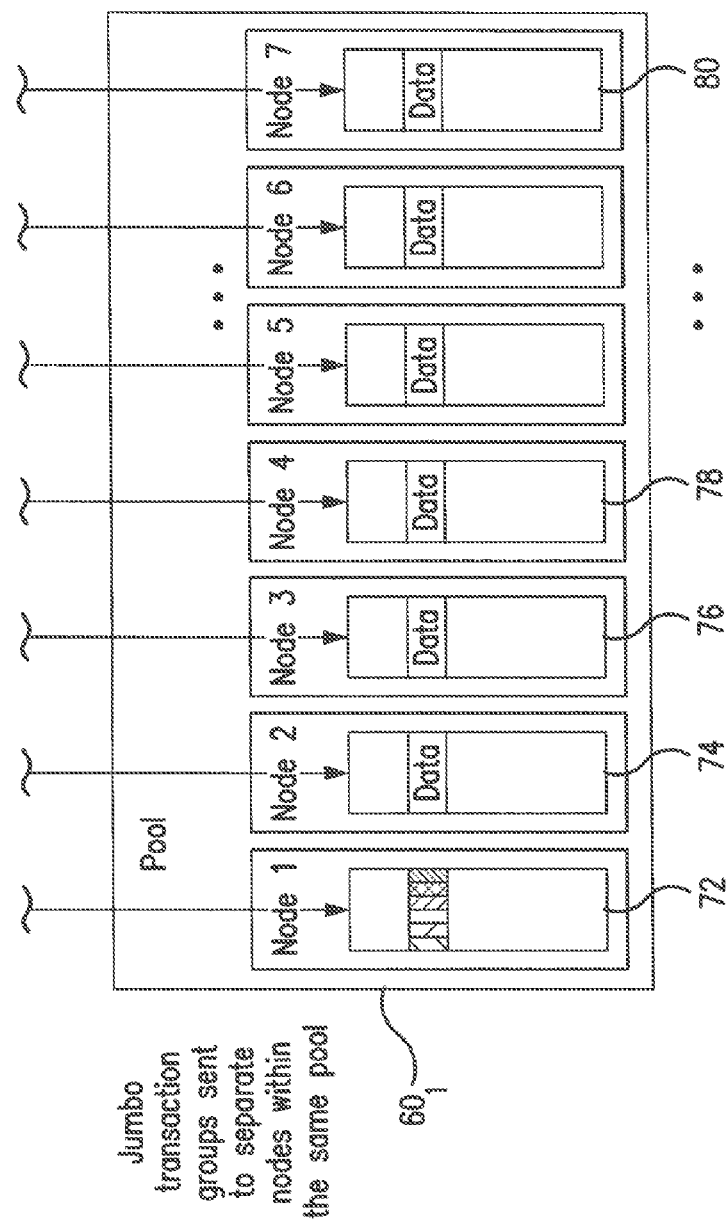
FIG. 4 represents schematically a process of writing discreet fragments of data to the IME client interface.
Figure 5A:
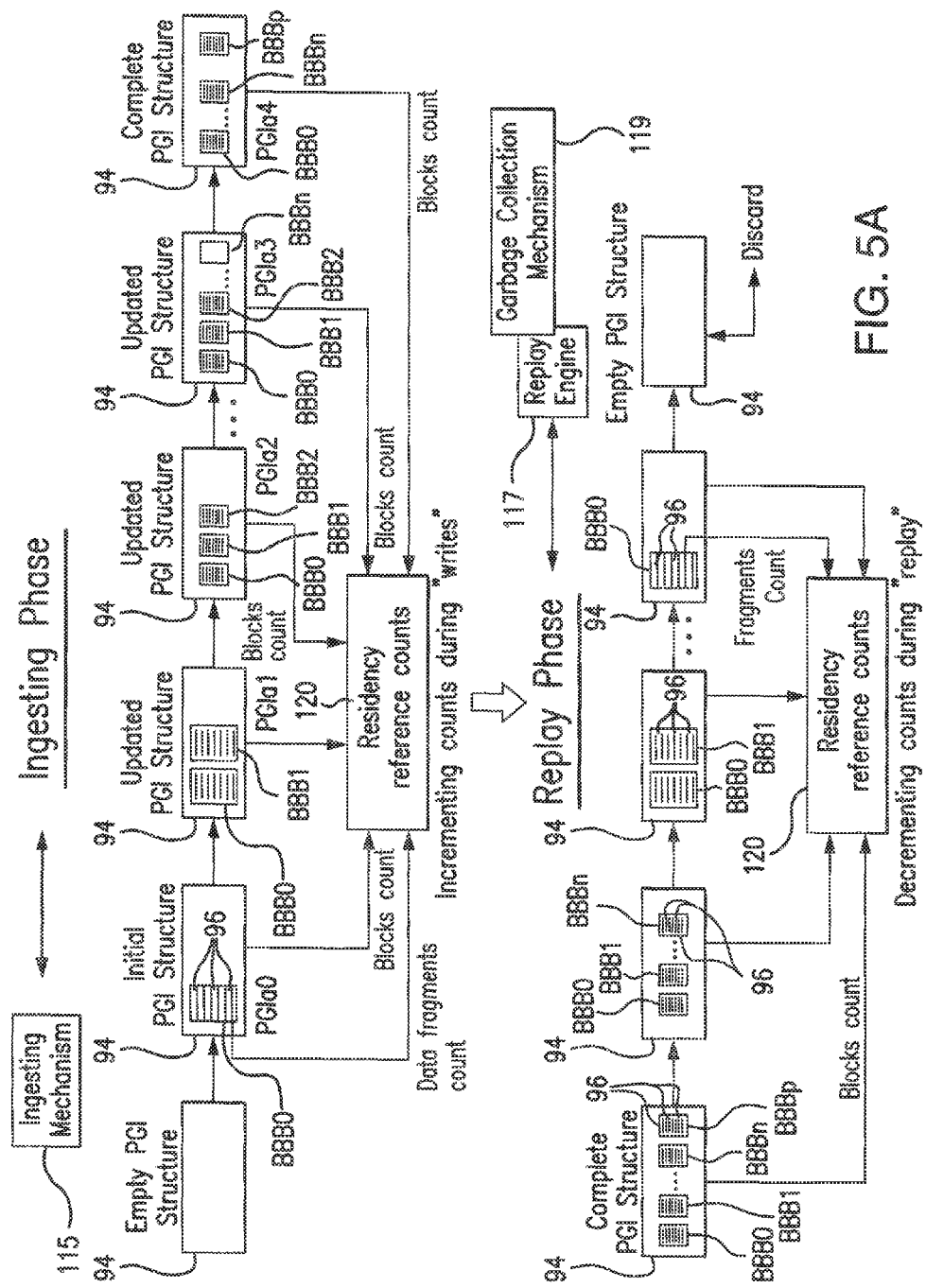
FIG. 5A is a schematic representation of the routine of updating of the PGI during the Ingestion Phase of operation and during the Replay Phase of operation, and a corresponding residency reference counting routine.
Figure 5B:
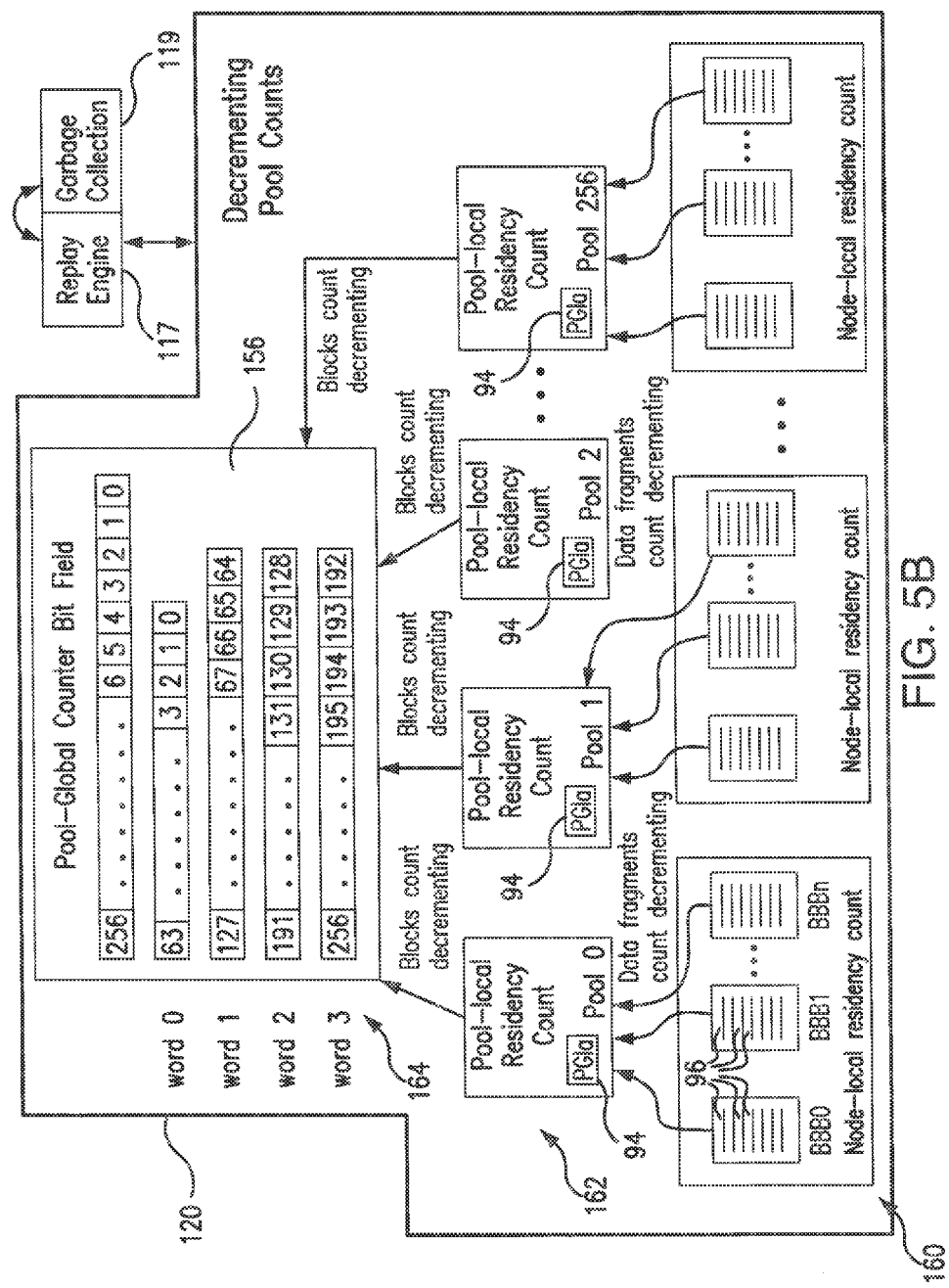
FIG. 5B is a schematic representation of the updating routine of the residency reference counters during the replay phase of operation showing a hierarchy for updating references counts from Node-local to Pool-local to Pool-Global residency reference count updates.
Figure 8:
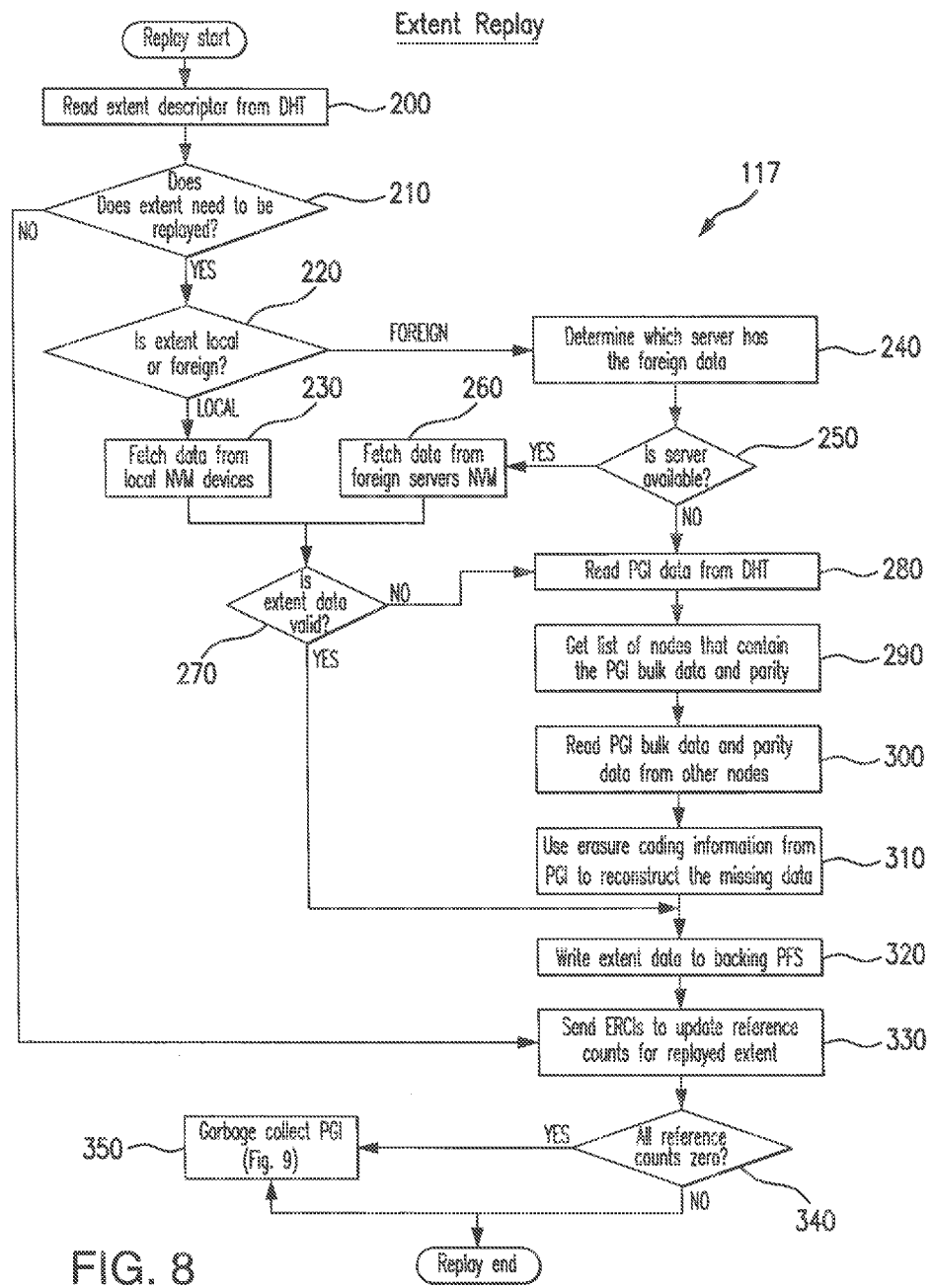
FIG. 8 represents a flow-chart diagram underlying the Extent Replay phase of operation for handling the "write" requests in the present data storage system.
Figure 9:
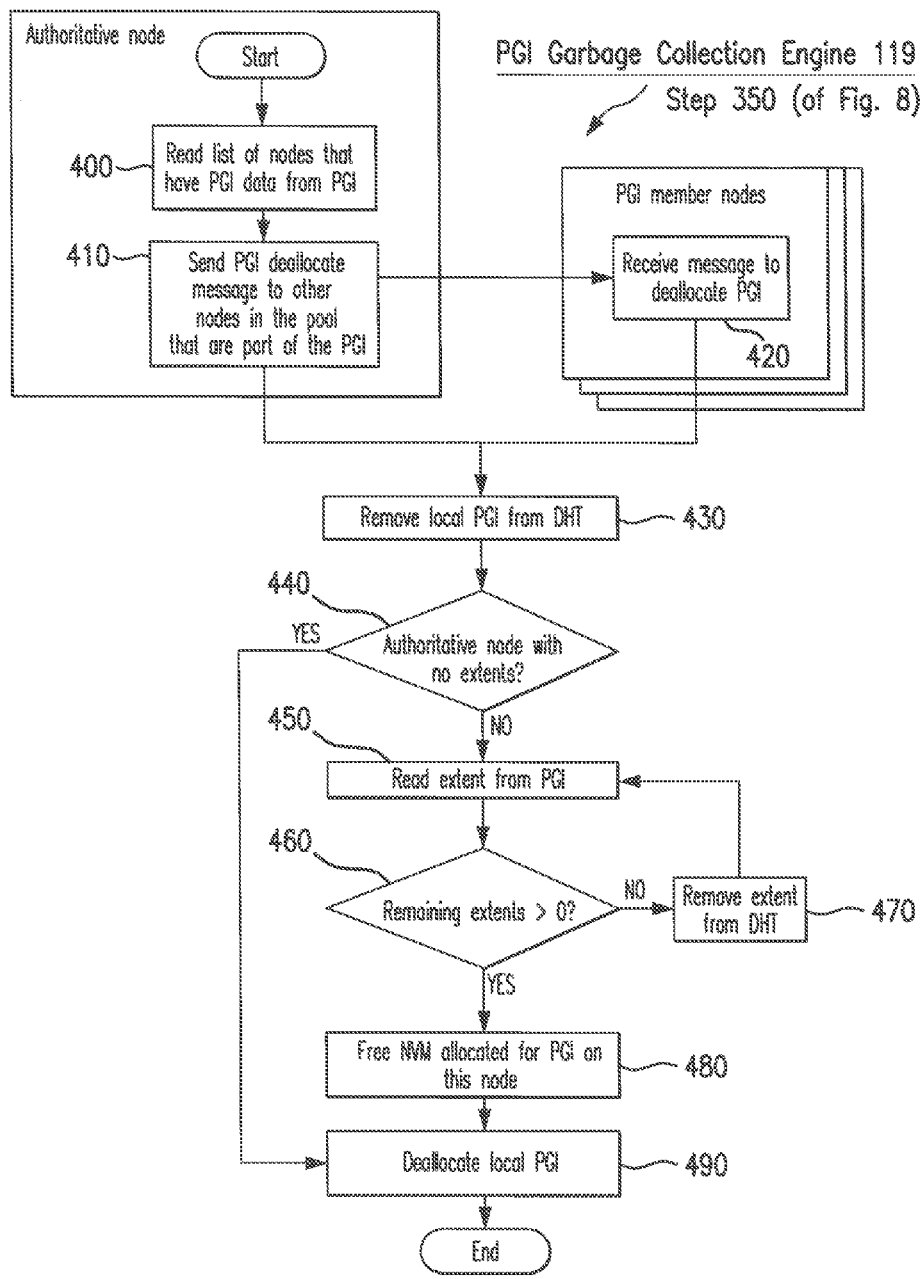
FIG. 9 is a flow-chart diagram underlying the PGI Garbage Collection phase of operation in the present data storage system.

The processes of handling "writes" in the IME based system 10 may be divided into the following phases: the phase of I/O ingestion which is carried out through the Ingestion mechanism 115 (shown in FIGS. 1, 2, 3A-3B, 4 and 5A), the phase of Replay into the Backing File System (BFS) which is carried out through the Replay Engine 117 (shown in FIGS. 1, 2, 5A-5B, and 8), and the phase of a post-replay garbage collection which is supported by the Post-Replay Garbage Collection Engine 119 (reflected in FIGS. 1, 5B, and 9). The process of handling "READ" requests is performed through the "Client Read" routine supported by the Read Engine 121 reflected in FIGS. 1 and 10. As shown in FIG. 1, the Replay Phase, Garbage Collection Phase, and Client Read routine need the Parity Group (local PGI) reclamation which is supported by Reclamation Engine 123 shown in FIG. 1 and detailed in further paragraphs.

The I/O Ingestion phase precedes the PGI Reclamation Scheme, and includes the routines of handling Parity Group ingestion into the NVMs 42 of the BB tier 40, as well as the construction and distribution of the PGI descriptors accompanying the Parity Group handling as part of the Pool-local addressing mechanism operatively cooperating with the Global Addressing Engine 54, as will be described herein in detail.

The phases subsequent to the Ingestion phase, i.e., replay into the Backing File Systems and post-replay garbage collection use the Reclamation Engine 123 (shown schematically in FIG. 1) which is configured with the operation of reclamation needed PGIs and processing the PGIs for restructuring aggregation of the Parity Group data migrating from the NVMs 42 to the primary storage 20, and for reading data from the NVMs 42 to be returned to the client, when needed. In all modes of operation, the subject Reclamation process employs PGI descriptors, and data reconstruction routine when needed for fault tolerance, as will be detailed in future paragraphs.

Referring to FIGS. 3A-3B, in the I/O ingestion phase addressed by the Ingestion mechanism 115, an Application 52 initiates data storage within the IME system 10 which may be carried out by using, for example, the client library available on the compute nodes 12. The client (or the compute node) 12 is outfitted with the write-back cache 34, best shown in FIGS. 2 and 3A-3B. Cache entities are maintained in an interval tree which is designed to aid in the aggregation management process for the output held in the write-back cache 34 of the compute node 12, specifically for the output of the Parity Group structures 32 constructed by the Application 52. The Parity Group structure in this context is referred to as a set of burst buffers blocks (BBBs), or Parity Group buffers, originating from a single client which form a redundant data set. A parity group's size and redundancy level may be determined solely by the client 12.

Further description related to FIGS. 2, 3A-3B, and 4, is focused, for the sake of disclosure simplicity, on construction of a single parity group 32 for ingestion in the I/O nodes configured in a single pool 60 (or 60$_1$). However, it is to be clear that Compute Nodes 12 generate dynamically a plurality of Parity Groups, each of which is to be ingested by the I/O servers constituting a respective one of a number of pools (60$_1$, 60$_2$, . . . , 60$_M$) existing in the BB tier 40 in a process similar to the exemplary one presented in conjunction with FIGS. 2, 3A-3B, and 4.

The client's write-back cache 34 is tailored to place data blocks of the Parity Group 32 (described further in detail in conjunction with FIGS. 3A-3B) onto the I/O servers 38 (also referred to herein intermittently as I/O nodes, or Burst Buffer Nodes BBNs) in the BB tier 40. Each I/O node 38 is responsible for a corresponding block's contents (extents) via the DHT 46 (best shown in FIG. 2), which is a lookup mechanism which is load-balanced across a set of nodes using deterministic functions to generate lookup handles.

The multi-step process of handling writes in the system begins with the clients' aggregation of "dirty buffers". The "dirty buffers" in this context refer to blocks in the data base buffer cache that have been changed (processed) but are not yet written to the primary storage sub-system.

As shown in FIGS. 1 and 3A-3B, the members of a single Parity Group 32, i.e., data blocks 62-68 and the Parity Block 70, reside in the single pool, for example, the pool 60$_1$ out of a number of pools in the BB tier 40. Thus, an IME pool forms a group of fault tolerant nodes.

However, the data fragments (extents) in the data blocks 62-68 and parity block 70 may belong to a file which constitutes a global object 152, i.e., an object that spans over nodes in more than one pool, as shown in FIG. 1. In this situation, a data fragment may be sent to any I/O node in the system, but there is a single I/O node (authoritative node) in a single pool accommodating the related Parity Group (which includes the data fragment in question), which is responsible for tracking this data fragment.

The most common global objects are the user files that are opened. A global object is created for each file that is opened through the IME to the BFS. This occurs when the client sends a request to open the file. All of the fragments in a PGI of a particular group will belong to the same file, i.e., the global object. In this manner, when the replay phase occurs, all of the PGIs that belong to a file should be deallocated when the replay is finished.

Multiple files (global objects) can be open at the same time. Each open file (global object) will have its own set of PGIs spread across all of the pools 60$_1$, 60$_2$, . . . , 60$_M$ in the system, as shown in FIG. 1.

FIGS. 2, 3B, and 4 show, for a sake of simplicity, a single pool 60$_1$, although it is understood that a number of storage pools 60$_1$, 60$_2$, . . . , 60$_M$ are accommodated in the BB tier 40. As shown in FIGS. 3A-3B, when in the process of flushing dirty write-back contents to the I/O servers 38, the compute node 12 attempts to compose a Parity Group 32 from a set of extents which share pool-wise affinity. As will be presented further, the extents (data fragments) that constitute a PGI will be affiliated with a single pool 60$_1$, also referred to herein as a BBN Pool which is a group of Burst Buffer Nodes (BBNs) which form a fault tolerance group. The Parity Group 32 is entirely housed within a single pool 60$_1$. A number of Parity Groups (Parity Group 1, Parity Group 2, . . . , Parity Group M may be generated by the compute nodes 12, each to be ingested in its respective pool (60$_1$, 60$_2$, . . . , 60$_M$). The process described of construction and ingestion of an exemplary erasure group 32 in the pool 60$_1$ is similar for all Parity Groups.

Within a single Parity Group 32, the client 12 attempts to build each block of data 62, 64, 66, . . . , 68, also referred to herein as BBB$_0$, BBB$_1$, BBB$_2$, . . . , BBB$_n$, to maximize server-level affinity to the best degree possible.

Each BBB$_0$, . . . , BBB$_n$ is referred to herein as a memory block, or a buffer, which is a unit (or a member) of the parity group 32. Burst buffer blocks may contain one or more extents (data fragments) 96 from any region of the same file. Burst buffer blocks are fixed size and may be ingested by any I/O node 38 which does not hold a member of the Parity Group 32.

As is seen in FIGS. 3A-3B, each data block 62, 64, 66, . . . , 68 is composed of data fragments 96 which may be related or unrelated each to the other.

When the Compute Node 12 completes the operation of assembling the group of blocks, an operation of the erasure coding is applied to the data blocks 62-68, and a parity block 70 (also referred to herein as BBB$_{po}$) is thus resulted from the erasure coding. The parity (or RAID) block 70 in conjunction with the data blocks 62, 64, 66, . . . , 68, forms the Parity Group 32.

An erasure code is a forward error correction (FEC) code for the binary erasure channel, which transforms a message of k symbols into a longer message (code word) with n symbols such that the original message can be recovered from a subset of the n symbols.

The present system may use, for example, optimal erasure codes for the erasure coding routine which have the property that any k out of the n code word symbols are sufficient to recover the original message (i.e., they have optimal reception efficiency). Optimal erasure codes include maximum distance separable codes (MDS codes). Parity check is the special case where n=k+1. Parity eraser codes are usually used in RAID storage systems.

The subject system also may use near-optimal erasure codes which trade correction capabilities for computational complexity; i.e., practical algorithms can encode and decode with linear time complexity. Such may include Tornado codes, as well as low-density parity check codes, Fountain codes, Reed-Solomon coding, Erasure Resilient Systematic Coding, Regenerating Coding, etc., which may be used in the subject process.

Once assembled, the parity group 32 is delivered to the appropriate pool 60 of NVM units 42 in the intermediate data storage sub-system (or BB tier) 40.

In the BB tier 40, each member of the parity group 32, i.e. the data blocks 62, 64, 66, . . . , 68, and the parity block 70, is consumed by a respective I/O server 38 within the BB tier 40.

The storage system 10 potentially includes thousands of I/O servers 38. The I/O servers 38 in the present invention are grouped into smaller failure domains which are called pools, $60_1, 60_2, \ldots, 60_M$, as shown in FIG. 1. In this manner, the system can easily survive multiple failures if the failures occur in different pools. All extents which are stored in the same pool, possess the "extent affinity". The "pool-wise affinity" refers to the extents (data fragments) which "land" in the same pool.

The members of a single Parity Group 32, i.e., data blocks 62-68 and the parity block 70, reside in the same pool 60. Thus, an IME pool forms a group of fault tolerant nodes. However, the data fragments (extents) in the data blocks 62-68 and parity block 70 may belong to a file which constitutes a global object, i.e., an object that span over the nodes in more than one pool. In this situation, a data fragment may be sent to any I/O node in the system, but there is a single I/O node (authoritative node) in a single pool accommodating the related Parity group, which is responsible for tracking this data fragment.

When the client has generated enough fragments 96 to form data blocks 62-68 to be written to corresponding I/O nodes 72-78, the client groups the blocks 62-68 into a stripe, and calculates the parity block 70 to form the Parity Group 32 which may be presented as a stripe of data to be distributed across the I/O servers in the local pool 60. Thus, the Parity Group 32 is envisioned as a stripe of Ad Hoc data to be written across multiple I/O nodes 38 with parity protection.

Referring to FIG. 4, which further details the process of the Parity Group 32 construction and ingestion in the peer nodes 72-80 within a local pool $60_1$, the application running on the client 12 writes discreet fragments 96 of data to the IME client interface. Subsequently, the fragments 96 are assembled into a local block descriptor 97. Several local block descriptors 97 which are "destined" for separate I/O nodes in the same pool $60_1$ are bound together and a parity data 70 is generated, thus completing the Parity Group 32 construction routine. The local blocks (block descriptors) 97 that are composed of the application data (fragments) are referred to as bulk data.

Subsequently, the local blocks of data fragments are placed into the Jumbo Transaction Table which assembles groups of blocks 97 into a Jumbo Transaction Group (JTG) structure 102. Once the Jumbo Transaction Table is full (or times out), the client flushes the JTG to the IME nodes 72-80. The blocks 97 are written to the NVM in the IME node, and an extent descriptor is created for each fragment 96 in the block 97.

In the subject system which features a plurality of pools $(60_1, 60_2, \ldots, 60_M)$ in the BB tier 40, as shown in FIG. 1, a similar process is performed for each pool wherein each of the pools stores its respective Parity Group (i.e., the Parity Group 1 in the I/O nodes of the Pool $60_1$, the Parity Group 2 in the I/O nodes of the Pool $60_2$, and so on, including a Parity Group M in the Pool $60_M$).

As shown in FIGS. 2 and 3A-3B, when the data generating entity (or client) 12 generates a "WRITE" request, the parity group's blocks $BBB_0$, $BBB_1$, $BBB_2$, . . . , $BBB_n$, and the parity block $BBB_{po}$ are distributed among the I/O nodes 38 of the BB tier 40 participating in the process in a non-deterministic way, and thus tracking of the BBBs supported through their effective addressing in a Pool-local and Pool-Global fashion is a vital feature of the subject system.

The system 10 is a distributed system where, in each pool, each respective I/O node 72, 74, 76, . . . 78, and 80 stores a respective one of the blocks 62, 64, 66, . . . , 68, and 70, respectively. When the client writes the Parity Group 32 in its respective pool in the BB tier 40, the client selects I/O nodes based on a hashing scheme for each data fragment 96.

The Pool-Local Addressing Engine 150 (for tracking data within a single pool) as well as the Global Registry/Addressing Engine 54 for the data tracking through the entire system over all the pools in the BB tier 40 is enhanced via construction and distribution of a Parity Group Identifier (PGID) and Parity Group Information (PGI) structure detailed in further paragraphs.

Parity Group Identifiers (PGIDs) are configured to provide globally unique handles for every Parity Group in the system. In principle, each I/O node 38 may generate PGIDs on behalf of any client. Further, the prescribed residency of the PGI structure is encoded into the PGID such that by knowing the PGID, the location of the PGI may be inferred.

FIGS. 3A-3B detail the data Ingestion mechanism 115 controlling the data ingestion from a single client (compute node) 12 to multiple I/O servers 38 within the IME system 10. Although describing a process of ingestion data into a single pool, a similar process is carried out for data ingestion in each of a number of the pools $60_1, 60_2, \ldots 60_M$ in the BB tier 40.

With regard to the pool $60_1$, assuming the data blocks 62, 64, 66, . . . , 68, and the RAID block 70 constituting the parity group 32, are to be distributed to the I/O nodes 72, 74, 76, . . . , 78, and 80, respectively, along with associated metadata 82, 84, 86, . . . , 88, and 90 corresponding to the data blocks 62, 64, 66, . . . , 68, and the parity block 70, respectively, which are also written in the BB nodes 72-80. The metadata copies written into the I/O servers 72-80 are identified as 82', 84', 86', . . . , 88', and 90'.

The metadata 82-90 are formed by the client 12 for the data fragments 96, and are assembled in the write back cache 34.

Due to the distributed nature of Parity Group members ingested into the BB tier 40, the addressing of the data "writes" into the BB tier 40 is an important part of the subject system which is enhanced by creation and dissemination of the PGID and the PGI structures. The Parity Group Information (PGI) is a structure that holds all the information about each of the blocks 62-68 and the parity block 70 of the Parity Group 32 including their residency, the I/O nodes they are written in, the location of the parity data, and the RAID protection being used (N+P). The PGI is thus represented as a distributed fully scalable network-level RAID on Ad Hoc data. The construction and distribution of the PGI will be detailed in the following description.

The I/O ingestion mechanism 115 in question requires the client 12 to first obtain a PGID 92 from the I/O server chosen to handle the first "write" request, for example, the I/O server 72. The I/O node 72 handling a first block "write", assigns a PGID 92 to the PGI 94 for the Parity Group 32 built by the client 12.

For example, upon receipt of the "WRITE" request from the client 12, the I/O server 72 assigns a unique PGID 92 to the Parity Groups' I/O and commits the data block 62, along with the metadata 82, to the NVM unit 106 associated with the I/O node 72. The PGID 92 is committed in the metadata section 82 of the I/O server 72 along with the bulk data of the block 62. This insures that on reboot, the last allocated PGID can be found through a simple File System Check (FSCK).

The PGID is also provided to the client 12 for writing in the metadata sections 84, 86, 88, and 90 of the data blocks 64, 66, . . . , 68 and the RAID block 70, respectively, so that all members of the Parity Group 32 are identified with the same PGID 92. The I/O nodes assign PGIDs sequentially to the step of updating the PGI, i.e., subsequently to the addition of the next member to the PGI.

The DHT 46 contains a DHT object 100 which is the object in the I/O node that holds the state of the system including the data fragment 96 and the PGI Data 92.

For every Parity Group's member (block) sent from the compute node 12 to a given I/O server, this server places resulting DHT objects 100 within a Jumbo Transaction Group (JTG) 102 of the I/O sever and proceeds to issue and commit that JTG. Once the I/O server in question has committed the JTG, the client 12 learns of this action, and marks that member (block) of the Parity Group as complete. Once the client 12 has received the notice from each server involved in the storing of the Parity Group 32, the client may free buffers 34 composing that Parity Group.

Specifically, each I/O node 38 stores the fragment data 96 with the metadata copies 82', 84', 86', . . . , 88', and 90' in the NVMs 42. The DHT object 100 holds a copy of the metadata 82', 84', 86', . . . , 88', and 90' in the main memory 104 with a pointer to the BBB in the NV RAM.

JTGs 102 are created in the memory on the DHT server 46 and are distributed among the DHT server's peers, i.e., DHT, $DHT_1$, $DHT_2$, . . . , $DHT_N$, during the first phase of a transaction commit. JTGs include a list of commands that mutate the DHT (i.e., related to objects insertion into the DHT, objects deletion from the DHT), and (if necessary) the list of objects 100 that will reside in the DHT.

Figure 6:
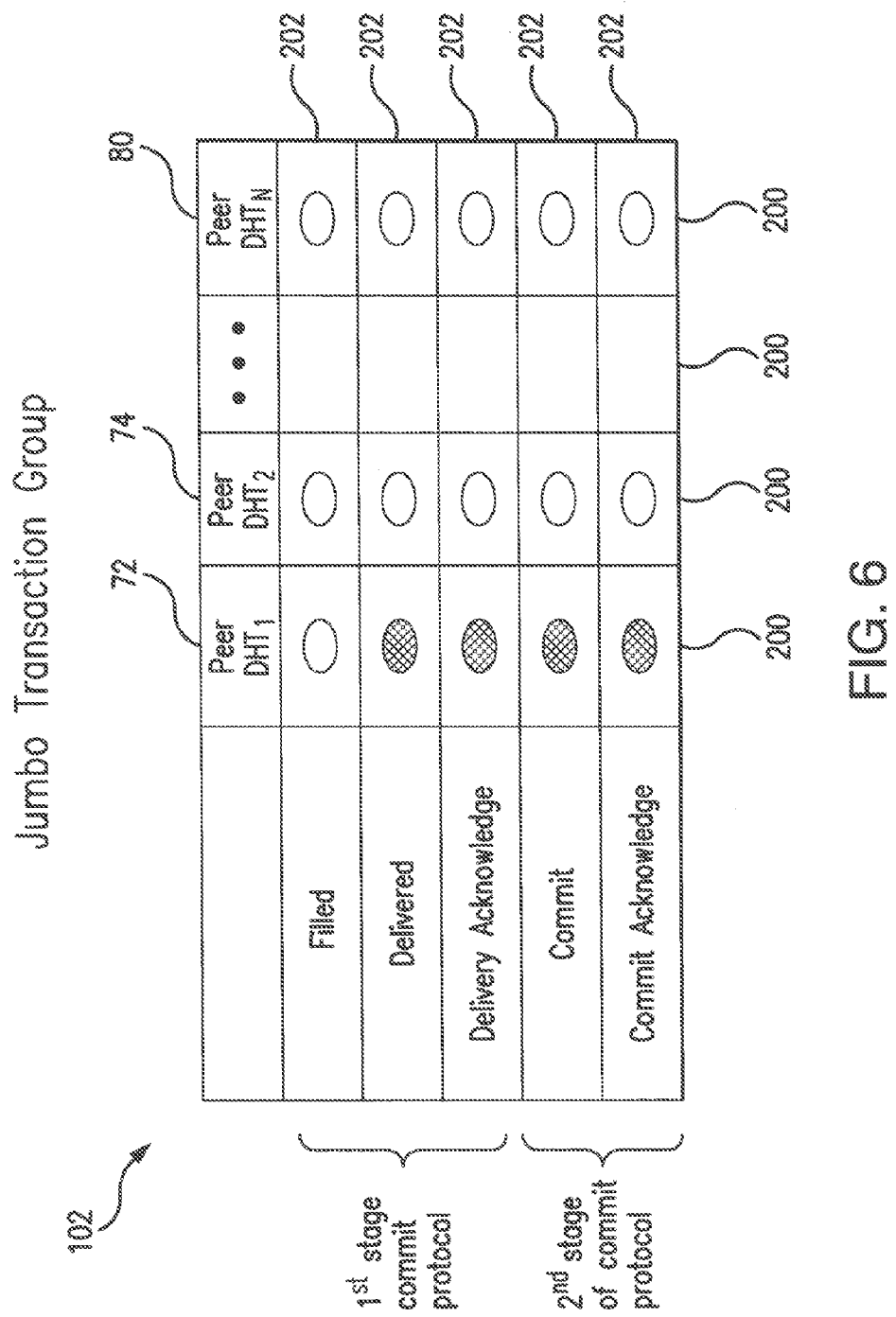
FIG. 6 is an abstraction representation of a Jumbo Transaction Group (JTG) used in the subject system.

Specifically, the JTG 102 is shown schematically in FIGS. 2 and 4, and an abstract representation of the JTG 102 is shown in FIG. 6. As shown in FIG. 6, the JTG 102 is constructed with a plurality of batched operations designated for the plurality of the I/O node peers (I/O nodes 72, 74, . . . , 80) sharing a local pool $60_1$ affinity. The JTG 102 is constructed in a similar manner for each pool $60_1$, $60_2$, . . . , $60_M$ in the BB tier 40.

The JTG 102 may include columns 200 dedicated to each of the plurality of I/O nodes involved in the JTG 102. The rows 202 of the JTG 102 are illustrative in FIG. 6 of the two-stage commit protocol for transactions between the I/O nodes in each pool $60_1$, $60_2$, . . . , $60_M$.

The first stage of the commit protocol addresses a "filled" request (meaning that a group of requests has been filled to capacity and is ready for the JTG to begin the delivery process), a "delivered" request (meaning that the request has been sent to an appropriate I/O node), and a "delivery acknowledgement" request (meaning that the request has been acknowledged by the intended I/O node).

The second stage of the commit protocol addresses the "commit" command and "commit acknowledge" request. The "commit" is a command to fulfill the request, such as, for example, to "write" it to the I/O node(s). The "commit acknowledge" is a response that the request has been completed.

This process ensures that these batched transactions are completed by each I/O node that is relevant to the request. By requiring "commits" and "commit acknowledgements", failures of I/O nodes during the process can be quickly alleviated, and non-responsive I/O nodes can be quickly identified.

JTGs may be used to batch a series of DHT objects requests, so that a given I/O node may make requests to all its peers in the same local pool. In this manner, the volume of traffic across the I/O nodes can be minimized.

After committing the bulk data 62 in the I/O server 72 (the first I/O node to ingest the member of the Parity Group 32), the I/O server 72 proceeds to enqueue a number of transaction-based operations into the current JTG 102.

Once a client has obtained the PGID 92 from the first I/O server 72 which ingested the data burst buffer block 62 ($BBB_0$), it may proceed to send the remaining Parity Group's members (data blocks $BBB_1$, $BBB_2$, . . . , $BBB_n$, as well as the parity block $BBB_{po}$) to other I/O servers 74, 76, . . . , 78, . . . , and 80 forming the respective pool $60_1$, $60_2$, . . . , $60_M$, as shown in FIGS. 3A-3B and 4. This bulk sends may occur sequentially or in parallel. Upon receiving the remaining parity group members (blocks 64, 66, 68, and 70), the I/O nodes enqueue the parity block reference count updates to the pool-local PGI maintainers, i.e., add the updates to their queue.

Figure 7:
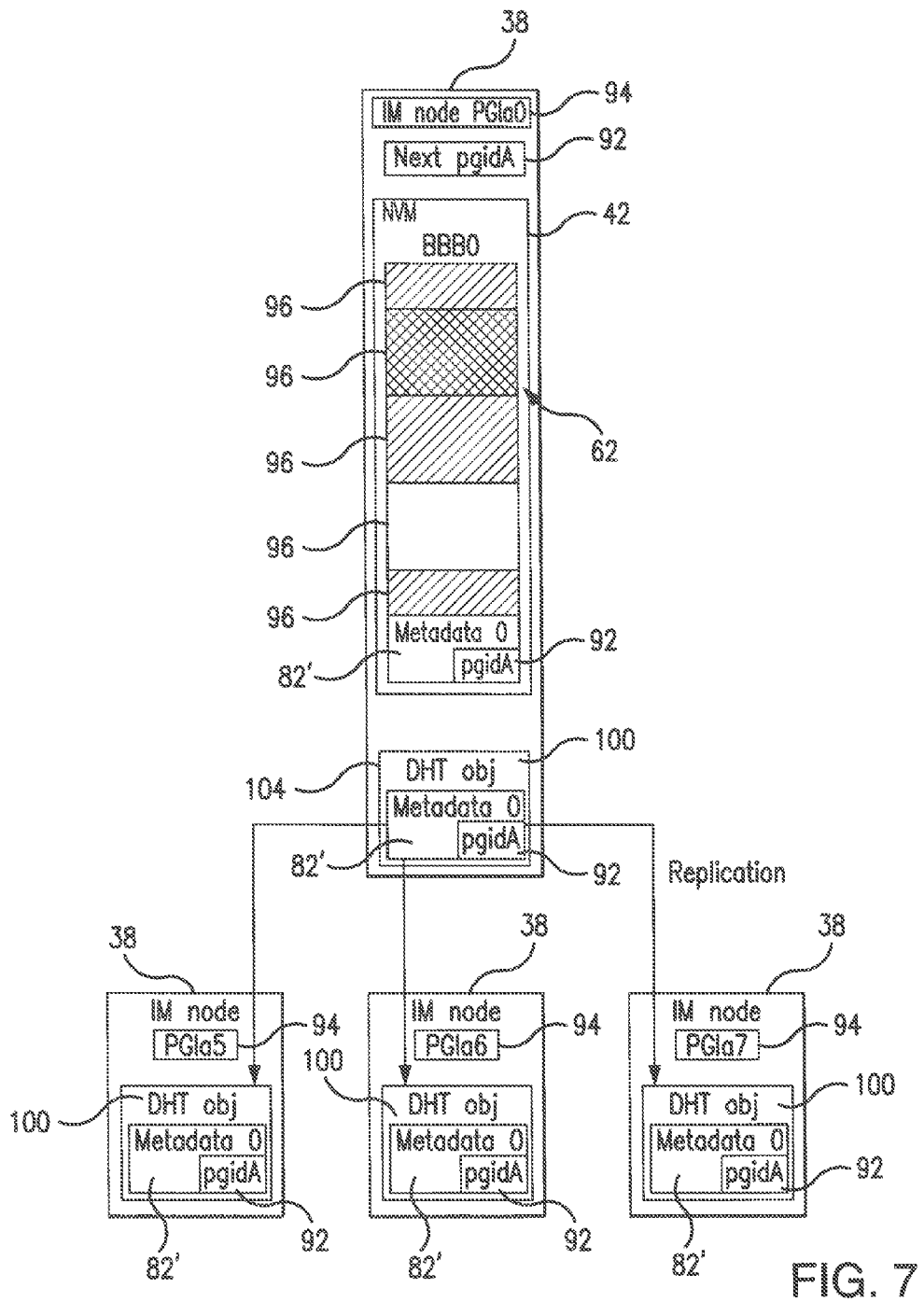
FIG. 7 is a diagram showing schematically the replication routine of the DHT object to other I/O nodes sharing the local pool affinity in the subject system.

Each PGI is fully independent. The PGI information may be replicated across multiple I/O nodes for redundancy, as shown in FIG. 7 which is a diagram representing the replication process of the DHT object 100 containing the PGI 94 metadata 82' to other I/O nodes in the present system. In this process, the I/O node which holds a part (data block or parity block) of the parity group, has a copy of the PGI 94, or knows which I/O node has an authoritative copy of the PGI.

In the I/O initiation process, the client requests that an I/O node creates a new (updated) PGI when the client sends a new data block that is not part of an existing PGI. Referring to FIGS. 3A-3B and 5A, representing the dynamics of the PGI creation and distribution supported by the Ingestion mechanism 115, an initial PGI 94 (for example, shown as PGIao) is created by the first I/O node 72 to reflect the ingestion of the first "write" data block 62. The client adds further additional "write" data blocks of the subject Parity Group 32, such as block 64, 66, . . . , 68, to the originally created PGI 94 by sending the remaining members of the Parity Group, i.e., $BBB_2$, . . . , $BBB_n$ (blocks 64, 66, . . . , 68) to other nodes, such as 74, 76, . . . 78, all of which share their unique PGID.

The PGI_update message is sent to an authoritative I/O node, i.e. the node handling a respective member (block) of the Parity Group 32 and is entitled to create an authoritative PGI reflecting the writing of this respective member. The PGI_update command is sent out each time the data block 64, 66, . . . , 68 is written.

For example, for the data block $BBB_1$, the I/O node 74 may be the authoritative node. Similarly, for the data block $BBB_n$, the I/O node 78 may be the authoritative node. Once the updated PGI is generated by the authoritative I/O node, the copy of the updated PGI is sent to all I/O nodes sharing the local pool affinity. Responsive to the storing of the block in the BB tier, the authoritative node updates the previous PGI to create updated PGIs (PGIa1, PGIa2, PGIa3, etc.) and sends the updated PGIs to other I/O nodes in the same local pool.

In FIGS. 3A-3B and 5A, the updated PGI after ingesting the data block 64 ($BBB_1$) in the I/O node 74 is shown as PGIa1. The updated PGI after ingesting the data block 66 ($BBB_2$) in the I/O node 76 is shown as PGIa2. Similarly, the updated PGI after ingesting the RAID block 70 in the I/O node 90 is shown as PGIa4.

The PGI is initialized with a number of composing blocks when it is created. This prevents the PGI from being reaped before it has been fully rectified by the entire complement of JTG updates from the I/O servers. The client completes the parity group put once each I/O server has replied success. Should one more server fail, the client is free to resend the parity group components to any I/O server in the pool which has yet to ingest a parity group member.

The parity (RAID) data are added to the PGI when the client allocates new data blocks for the RAID protection, calculates and saves the RAID protection data into the RAID segment buffers, and sends the RAID block 70 to I/O node(s) 80 that has not yet consumed a data block from the current PGI.

Upon completion of the process of writing each component of the parity group into the BB tier 40, the client sends an update message to the authoritative I/O node for the PGI update for each RAID block added. The authoritative I/O node is the node responsible for a given range of the filesystem address mapping for read. The number of authorities for a given range is dependent on the value of the burst buffer configuration. When the PGI is full and all the I/O nodes have responded that the data block 62-68 and the RAID (parity) block 70 have been saved to the NVMs in the BB tier 40, the PGI is closed and saved.

The "first to write" I/O node 62 creates the unique PGID 92 for the initial PGI 94, sends it to the client 12 for storage in the respective metadata section of the write blocks 64 . . . 68, as well as of the parity block 70, and subsequently writes each block to the corresponding NVM unit 42.

The PGI on the I/O node 62 which has created the PGI, becomes an authoritative PGI. The client then sends updates to the I/O node 62 to update the authoritative PGI when additional data or parity blocks are added to it. Subsequently, the updated PGI is sent to other I/O nodes in the pool 60. The client 12 who has requested the creation of the PGI will be the only one to add the write blocks of the parity group 32 to the PGI in question.

The PGI structure contains the information which is used to locate each data block and parity block of the parity group 32. Each data block and parity block 62, . . . , 70 has a unique ID in the system. The PGI holds the blocks' ID and the ID of the I/O node where the data block or parity block is located. However the PGI does not have sufficient information on the data fragments 96 in each data and parity block, or which file the data fragments 96 belong to. That information is stored in the metadata region 82, 84, 86, 88 and 90 of each data and parity blocks 62-70, respectively.

The I/O node 62 that creates the initial PGI structure 94 stores the authoritative copy of the PGI in its main memory 104. Contents of the authoritative PGI are replicated to other I/O nodes as shown in FIG. 7. When the PGI is full and closed, it is saved into the NVM unit of the authoritative I/O node that created it.

As shown in FIGS. 3A-3B, for any given data and/or parity block 62, . . . , 70 of the parity group 32, there is a single corresponding I/O node 72, . . . , 80 which is responsible for this block. The authoritative I/O node for the PGI is the one that has created the PGI and assigned it a unique PGID. The node 72 may be considered an authoritative I/O node for the PGIa0. All other copies of the PGI on other I/O nodes are non-authoritative. If the authoritative I/O node fails, then one of the non-authoritative copies of the PGI will become the authoritative PGI.

The non-authoritative PGIs will be identical to the authoritative PGI. However, any changes that are performed on the PGI are performed on the authoritative PGI first and subsequently are replicated to the non-authoritative PGIs.

The IME client and the IME server(s) interact during the Ingestion Phase 115 for the creation and distribution of the PGI in the process of writing the parity group 32 to the BB tier 40. Upon the construction of the parity group 32, the client 12 attempts to store the parity group in a respective pool $61_1$, $60_2$, . . . , or $60_M$ of the intermediate storage sub-system 40, by first requesting the $BBB_0$ flush to a respective I/O node (server).

Upon receiving the "write" request for $BBB_0$ block, which is the first burst buffer block of the parity group, the I/O node assigns the PGID to the Parity Group in question and PGID is committed in the metadata section of the write data. Subsequently, the logic attempts to execute PGI_create routine at the I/O node side of the process.

The following transactional PGI related instructions are employed in the I/O ingestion phase: Parity Group Information create (PGI_create) and Parity Group Information update (PGI_update).

PGI_Create

PGIs act as collection points for the state describing the residency and replay status of parity groups. PGI_create instructions are issued by an I/O server when that I/O server detects a new parity group being stored by client. The PGI_create command is executed by the nodes PGIa before the commit of JTG has occurred. The I/O server recognizes this fact by noticing that a client has attempted to store the first burst buffer block $BBB_0$ of a parity group. At this moment the I/O server enqueues the PGI_create instruction to the servers in the pool which maintain the authoritative PGI (PGIa) shown in FIGS. 3A-3B. Any member of the pool which holds a data or metadata segment for a given PGID will have a PGI structure for this purpose. However, only the properly designated nodes may manage the authoritative PGIs for the pool.

This is done to avoid erase conditions where I/O servers attempt to operate on the PGI before it has been initialized. Since an empty PGI is only a handle, creating it in this manner does not cause metadata consistency issues if the JTG fails to be committed.

PGIs are initialized with the parity group identifier (PGID) and the properties of the parity group, such as erasure coding type and size. At initialization time the PGI has no information regarding the residency or fragment count of its blocks.

Subsequently, a new PGI (i.e., the $PGIa_0$ shown in FIGS. 3A-3B and 5A) is created by the I/O node handling the first "write" $BBB_0$. Subsequently, the first PGI is enqueued into the main memory 104 of the I/O node 72, particularly into JTG 102 corresponding to the I/O server handling the $BBB_0$ write.

Upon completion of the PGI_create instruction, the data block $BBB_0$ is stored in the NVM 42. The PGI on the I/O node which created it becomes the authoritative PGIa. Subsequently, the I/O node sends response containing PGID to the client.

At the client's side of the process, after flushing the $BBB_0$ to the respective server, the client waits for the server to perform the PGI_create and "write" the $BBB_0$ to the respective NVM. The client obtains the PGID assigned by the I/O server from the reply for $BBB_0$ commit received from the I/O server and subsequently initializes the PGI with a number of composing blocks of the corresponding parity group, erasure coding type, and the size of the parity group and composing blocks.

The client does not receive a copy of the PGI that was created by the I/O server, but upon obtaining the PGID, the client has all the information necessary to recreate the PGI created by the I/O server. So, the client fills in its copy of the PGI with the PGID sent from the I/O server, and the information for the first block $BBB_0$ it added.

Subsequently, the rest of the blocks of the parity group are sent to the other I/O servers in the pool which have not ingested the blocks of the parity group in question yet. Prior to sending the rest of the data blocks and the parity block of the parity group in question, the client waits for the corresponding I/O servers to save the buffers (blocks) to their NVMs after the client sends the buffers to these servers.

At the I/O server's side, when the I/O servers (other than the I/O node handling the first block $BBB_0$ write), receive the "write" request for the remaining blocks in the parity group, i.e., for those which are not the first burst buffer block $BBB_0$ of the parity group, the data in $BBB_1, BBB_2, \ldots, BBB_n$ is stored in the respective NVMs 108, and 110, . . . , 112, respectively.

The $BBB_1, \ldots, BBB_n$ "writes" may be performed sequentially or in parallel. Each time an additional block $BBB_1, \ldots, BBB_n$ is written with the corresponding NVM, the authoritative I/O node performs the PGI-update routine resulting in the initial PGI update to add the information corresponding to each added data block. Upon writing each remaining data block (other than the data block $BBB_0$), the I/O node sends a response to the client which waits for the response from the I/O servers ingesting the data blocks $BBB_1, \ldots, BBB_n$. The system also checks whether the parity (RAID) block 70 is ingested within in the corresponding NVM 114. If it is determined that the parity block has not been stored in the NVM 114 yet, the I/O node sends a request to the client to send the parity block.

PGI_Update

If, however, the parity block is stored in the NVM 114, the system performs the PGI_update routine, thus creating the PGI for the complete parity group stored in the I/O nodes of the same pool, and thus the procedure for storing the parity group, PGI creation is completed.

The PGI_update instructions are delivered to the I/O nodes holding authoritative PGIa after the ingest of a respective data block by an I/O server. Unlike the PGI_create instructions, the PGI_update instructions are executed only after the owing JTG has been committed by the initiating server. PGI_update instructions instruct the authoritative nodes PGIa to attach the provided burst buffer block state to the corresponding PGI. The parameters provided by the instruction are the PGID (which does not change), the block number within the parity group, the number of discrete extents within the block (data fragment count), and the residency information. The residency information may take two forms including a server address or a block address if the block has been stored locally, i.e. in the local pool.

Once the PGI has been fully populated, the IME system 10 may perform rebuilds on behalf of failed nodes or NVM devices. If a failure of at least one server has been found, the client can resend the parity group components to any I/O server which has yet to ingest a parity group member.

If none of the servers failed, the logic flows to block 164 to complete the parity group put and the procedure is terminated.

A Residency Reference Instruction is a transactional command which is employed in the I/O ingestion phase in the subject system. The residency reference command is used to denote data residency within the BB tier on behalf of a specific file object. These are generally composed of pool-local and global reference objects (as will be detailed in further paragraphs).

The Residency Reference Counts Structure 120 (shown in FIGS. 1, 2, and 5A-5C) indicates the number of active references to an object, such as, for example, a PGI or a "write" block, in the system. A "write" block contains a number of fragments 96 of file data, so its residency reference counts may be represented by an integer that counts the fragments of file data.

As shown in FIGS. 1 and 5B, the Residency Reference Counts Structure may be conceptually represented by a Local Object Residency Counter (also referred to herein as a Node-Local residency counter) 160 for counting Local Objects (such as, for example, fragments, or fragment descriptors, a Pool-Local Residency Reference Counter (also referred to herein as a Pool-Local Object Counter) 162 for counting Pool-Local objects (such as, for example, PGIs), and Pool-Global Object Counter (also referred to herein as a Pool-Global counter) 164 for counting Pool-Global Objects 152 (such as, for example, file descriptors). The Local Object Counter 160, Pool-Local Object Counter 162, and Pool-Global Object Counter 164 may be configured as separated entities, or as a combined entity, as long as their operational interaction follows a hierarchy of objects state change established in the subject system to prevent N→N or N→1 communication patterns.

As shown in FIGS. 1 and 5B, once the state of the Local Object changes, the Local Object Counter 160 reports to the Pool-Local Object Counter 162. Once the Pool-Local Object changes its state, the Pool-Local Object Counter 162 reports the change to the Pool-Global Object Counter 164.

The residency references are accumulated as part of the data ingestion phase and are removed as data is replayed into the BFS (which will be described in further details infra). Once the last reference has been removed, the system may assume that no dirty data remains in the Burst Buffer storage.

As presented in FIG. 5A, in the Ingesting Phase 115, the reference count is incremented for each data fragment 96 added to the block (or block descriptor 97), as shown in FIG. 3). Similarly, the counts for blocks are incremented as new blocks $BBB_0, BBB_1, BBB_2, \ldots, BBB_n$ and $BBB_p$ are added to the PGI, i.e., the empty PGI is updated to the Initial $PGI_{a0}$ when the block $BBB_0$ is added. The ingestion process continues as the remaining blocks $BBB_1, BBB_2, \ldots, BBB_n$, and $BBB_p$ are added till a complete PGIa4 is created for the completed Parity Group put. The Residency reference count is incremented as the blocks are added to the PGI.

For the PGI, the Pool-Local Residency Reference Counter 162 is represented by a bitmap (not shown) where the bits represent the "write" blocks that were added to the PGI during PGI_update routine.

Further, the fragment count may be used by the Replay Engine 117 (shown in FIGS. 1, 2 and 5A-5B) to track garbage collection readiness for the Parity Group in question, as will be detailed in following paragraphs.

As presented in FIG. 5B, when the Local Objects, such as, for example, the data fragments 96 in the "write" blocks ($BBB_0, BBB_1, \ldots, BBB_n$) are replayed to the Parallel File System, the reference count in the Node-Local Residency Counter 160 is decremented, and the data fragments count decremented value is sent to the Pool-Local Residency Counter. When the reference count on the data block reaches zero, meaning all of the fragments 96 in the data block BBB have been replayed, the residency reference bit in the PGI for the "write" block in question in the Pool-Local Object Counter 162 is cleared. When all of the residency reference counts in the Pool-Local Residency Counter 162 are zero (for all blocks), meaning that the entire PGI has been replayed, the PGI can be discarded.

As detailed in FIG. 5B, during the Replay Process, the blocks count decrementing value may be sent to the Pool Global Counter 164, which is represented by a Bit Field, each bit of which representing a respective pool in the BB tier. Once the PGI (in the Counter 162) has zero blocks, the PGI can be discarded, and the bit in the counter 164 corresponding to the pool with the discarded PGI, is cleared.

Although shown in FIG. 5B that decrementing residency counts values are sent from the Local Object Counter 160 to the Pool-Local Object Counter 162, and from the Pool-Local Object Counter 162 to the Pool-Global Object Counter 164, in an alternative embodiment, it is contemplated that a signal corresponding to a "zero situation" is sent from a "subordinated" counter to a "higher" counter, i.e., when all fragments in a data block are replayed (in the Local Object Counter 60) and the block bit is to be cleared from the Pool-Local Residency Counter 162, or when the entire PGI has been replayed (in the Pool-Local Object Counter 162), and the pool bit is to be cleared from the Pool-Global Residency Counter 164.

Along with the reference count updates, the extent descriptors themselves are placed into the JTG 102 for dissemination to the appropriate peers (I/O servers in the same pool).

The process of a parity group creation and saving in the BB tier has been described in previous paragraphs in the pool-local fashion, i.e., with respect to one of a plurality of pools $60_1, 60_2, \ldots, 60_M$ existing in the BB tier. However, a number of pools are provided in the BB tier, which can accommodate a number of dynamically generated erasure groups (parity groups) distributed therebetween with each erasure group accommodated by a respective single pool. The members of the erasure group, including data blocks and parity block(s), must reside within a single pool of the I/O nodes. However, the fragments 96 in the data blocks in the PGI structure of the parity group in question may belong to a file which is categorized as a global object 152 (shown in FIG. 1). A fragment 96 may be sent to any I/O node in the BB tier, but in the present system, there is only a single node in a single pool that is responsible for tracking this fragment.

Due to the hierarchy established in the subject system between the objects to prevent N→1 or N→N communication in the present system, a fully distributed communication scheme shown in FIG. 1 is carried out, which scales up as the number of members (local objects, or pool objects) increases as requested by the operation, or scales down otherwise.

Global distributed objects 152 may be used in the subject system in cases where an exclusive entity must be maintained across the entire system. Such examples include tracking of open() and close() calls issued by a large parallel application. Similarly, on replay phase of files to the BFS that span many or all of I/O nodes in the BB tier, global reference objects are used by the system to track when replay activities have been completed. Another case could be inode (index node) attributes for a given object. Any place where a single authoritative entity is required, a global object can be used to meet that need. As shown in FIG. 5B, as the pool count value is decremented, the bits corresponding to the discarded PGIs (pools) are cleared from the bit field in the Pool-Global Object Counter, until all bits are cleared, meaning that the Global Object is closed.

Returning to FIG. 1, an example of a global object 152 may be a file descriptor. It may hold the information about the open file in the IME. When the global file descriptor is created, a pool file descriptor object is created in each pool $60_1, 60_2, \ldots, 60_M$, to hold information about the global file object. Each pool file descriptor object points to the global file descriptor object. The global file descriptor object is deleted when the file is closed and each pool reports it has closed its pool file descriptor object and removed it.

An example of a pool-local object may be a PGI. The PGI is created on the I/O node that owns the PGI (authoritative node). The members of the PGI pool object are the I/O nodes, each containing one bulk data block of the PGI. The PGI pool object is cleaned up when each fragment 96 in each bulk data block $BBB_0, BBB_1, \ldots BBB_n$ on each I/O node in the pool ($60_1, 60_2, \ldots 60_M$) is removed, as shown in FIG. 5A.

An example of a local object may be a fragment descriptor, which may be created on the I/O node which receives a fragment 96. The fragment descriptor local object is considered to be cleaned up by the I/O node when the fragment in question is removed therefrom.

Reference objects in the subject system are used to determine if any part of the system is using an object that the reference object points to, or to help to determine if they are empty or not, or to determine how many users have the file opened at a particular moment.

The IME divides (or shards up) the files across the I/O nodes in the BB tier, and assigns each shard several reference objects to track the number of processes using the part (or shard) of the file of interest. The IME also can track the number of fragments that have been written into the BB tier by the clients.

Figure 5C:
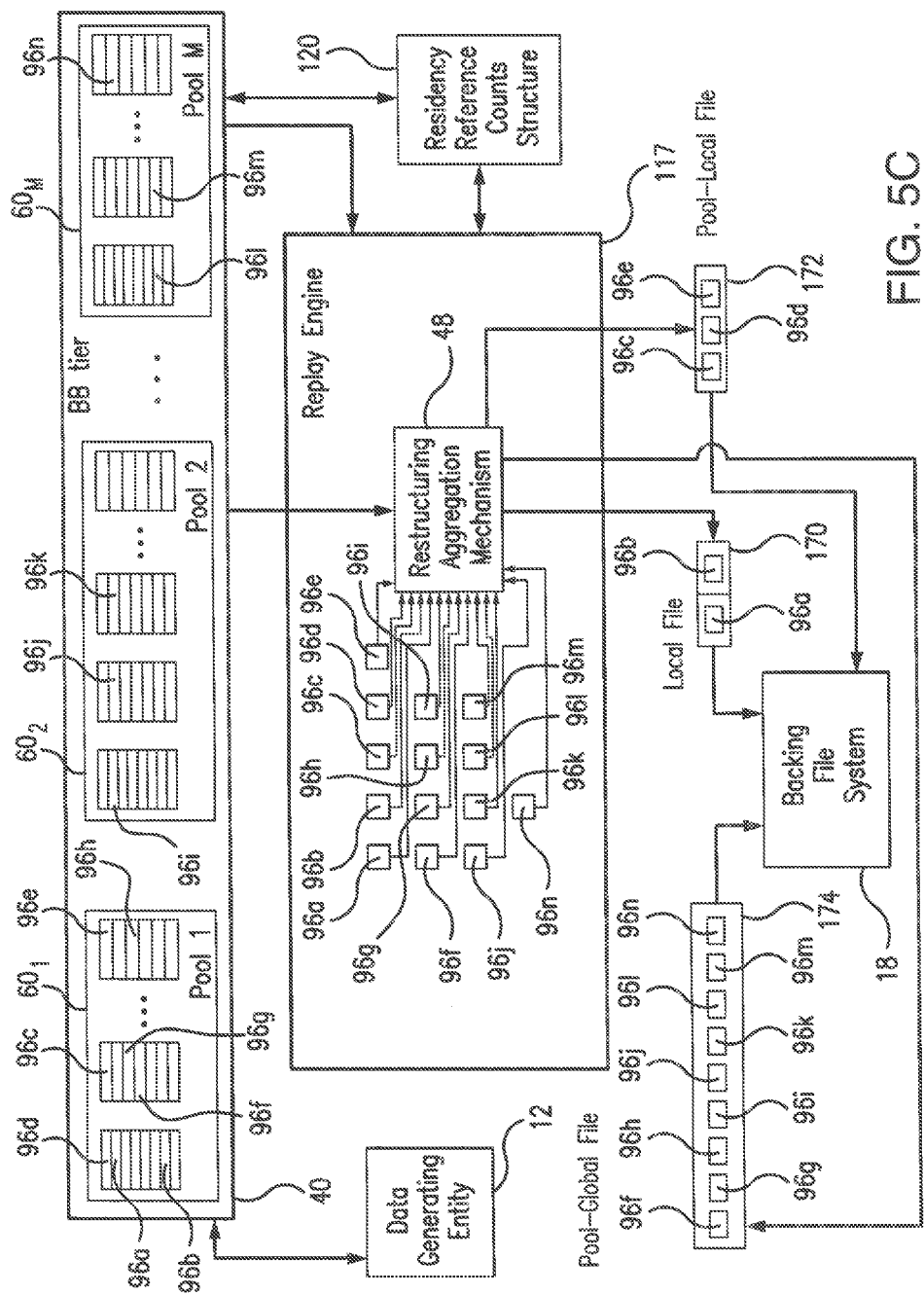
FIG. 5C is a simplified schematic representation of the Replay Phase of the data migration in the subject system enhanced by the restructuring aggregation of the unstructured data stored in the BB tier into structured local, pool-local and pool-global files for being written into the Backing File System.

During the replay phase, the count is decremented after each fragment is written from the BB tier to the Backing File System, as shown in FIGS. 5A-5C. When the count of fragments reaches zero, then the IME "knows" that all of the data for a portion of interest of the file has been flushed out of the BB tier.

Another use of the reference objects is to track the number of dirty (or unwritten) fragments that are part of a bulk data block sent by the client to a respective I/O node in the BB tier on a "write" request. The fragments in the bulk data block may be unrelated, so reference objects are created to track which ones need to be flushed to the BB tier.

Similar to the local, pool and global objects, the referenced objects may include node-local reference objects, pool-local reference objects, and pool-global reference objects.

Node-Local reference objects are local to a single node. Actions to a node-local reference object are performed directly by function calls within the node.

Pool-Local Reference Objects

The foundation of the global distributed reference object is the pool-local reference object which itself is used by a variety of tasks. These include determining when a parity group may be garbage collected. The pool-local reference objects act as subcomponents for global reference objects. The complexity surrounding replicated reference count objects within the DHT is hidden by the two-phase commit distributed transaction engine, which consistently manages updates to replica objects. The pool-local reference object resides in one node (authoritative node) in the pool. The authoritative node has a primary ownership of a pool object. There are also back-up nodes that will assume an ownership of the pool object if the primary (authoritative) node fails.

Actions on a pool reference object require RPC (Remote Procedure Call) commands over the network. A pool reference object is composed of a node-local reference object with an API configured with RPC commands to perform the function calls.

Pool-local reference counts (objects) operate in the following manner. The DHT 46 application wishing to establish a reference count does so by first hashing the reference object's identifier in a manner which exposes the owning pool and I/O nodes.

For example, to establish a reference object for extents belonging to a given file, the application would present a tuple composed of the file identifier (FID), rank number, and a specific number which is assigned to the reference type, to the hash function. The hash function outputs the corresponding server, though any server in the pool is a valid target for the request.

Upon receiving a reference request, the server uses this information along with the operation type (increment, decrement, create, destroy) to construct a DHT object on behalf of the reference. Subsequently, the server will submit the DHT reference object through its two-phase commit technique so that the relevant successors will become aware of its existence. Querying of the reference may be done by clients and servers alike through direct access by sending a DHT fetch request to one of the available successors. However, modifications of reference objects, as previously described, must be handled through the transactional mechanism to ensure consistency.

Pool-Local reference objects operate in a manner similar to a typical reference counter. A Pool-Local reference is logically tied to its global object which may exist in the same pool or in another pool. However, the global object is only updated when a pool-local object encounters a state change involving zero. In other words, when the pool-local object changes 0→1 or 1→0 the global object is updated to reflect the new state of the pool in question.

Pool-Global Reference Objects

A Global reference object is composed of multiple pool-local reference objects which have been designed as components of the Global reference object. This reference object type is meant to provide scalability in situations where a large number of clients perform a coordinated global activity such as I/O on a large shared file. Theoretically, global reference objects allow for a scaling factor equivalent to the number of pools in the system.

The global reference object does not resemble a typical reference counter but rather, it appears as a bit field (bitmap) where each bit is designated for a single pool in the system.

One global bit field 156, as shown in FIG. 5B, is a set of words, for example, 64 bit length. Each bit in a word is assigned to a specific pool. As presented in FIG. 5B, the global bit field 156 is composed of four words, each 4 bits long, and thus refers to 256 pools in the system.

In order to determine the bit location of a pool of interest, the calculations are performed based on the following equations:

Word_size=64 (as an example for this particular architecture)

Bit=pool%word_size

Word=pool/word_size

Actions on a pool-global reference object require RPC commands over the network. A pool-global reference object is composed of a pool-local reference objects with an API (Application Program Interface) configured with RPC commands to perform the function calls. RPC is a protocol that one program can use to request a service from a program located in another computer in a network without having to understand network details. A procedure call may also be referred to as a function call (or sub-routine call). RPC uses the client/server model, where the requesting program is a client, and the service-providing program is a server.

A Global reference object is created by first creating a pool-local reference object which has been tagged with some state designating it as a member of a global reference object. An object ($Pool_L$) that is local to a pool encapsulates its pool-local reference request within a JTG. Upon execution of the JTG, the successors of the object will message the global object ($Pool_G$) instructing it to establish the global reference. This request will block until the $Pool_G$ has committed the request via a transaction in its pool.

The pool-local object $Pool_L$ is composed of a pool-local reference object, while the pool-global object $Pool_G$ is composed of a global reference object with a counter which is referenced by subordinated pool-local objects.

Once the $Pool_L$ has created this object and instructed $Pool_G$ to do its part, $Pool_L$ may proceed with local operations on the pool-local reference object until the pool-local reference object count reaches zero. At that time $Pool_G$ is contacted and instructed to remove $Pool_L$'s reference.

When the pool-global reference object no longer contains any pool-local reference objects, an arbitrary routine may be executed on behalf of the object. For example, consider the IME replay engine. Replay phase represents a case where certain operations must block until the entire system has completed the data movement portion of the replay procedure. While a given pool has extents to replay, the global reference object reflects this state with a single bit for the pool in the global bit field. When the pool has completed its extent operations, the global reference object is unreferenced. Subsequently, when the global reference object is fully unreferenced, a single finalization operation (such as a namespace operation) may occur in a fully non-reentrant context.

When the Parity Group in the system needs to be replayed from the BB tier 40 to the Parallel File System, an I/O node begins taking all of the data fragments and metadata stored in the DHT and "flattens" them. The term "flattens" means in this context that any older fragment data that was overwritten by newer fragments is discarded so that only the latest (or final) fragment data is written to the BFS.

Subsequently, the I/O node begins reading the flattened data fragments out of the NVM and places them into buffers, thus performing a somewhat random read from the NVM.

Subsequently, when the buffers are full, the I/O node issues "write" requests to the BFS to commit the data. The information, about the blocks contents (data fragments in each block) is stored in the metadata section of each block in the NVM of the corresponding I/O node, as shown in FIG. 3A-3B. The data fragments information is also stored in a more compact format in the main memory 104 of the I/O node.

The PGI does not have all information of the data fragments. The PGI's function is to track BBBs which are the members of the Parity Group. The PGI is used for redundancy purposes. If an I/O node, or memory unit (HDD, SSD, etc.) fails, or a device reports a "bad" block, then the PGI tracks all of the members of the Parity Group that are needed to reconstruct the missing data. Once all of the blocks in the PGI are replayed to the PFS, the PGI will be discarded.

As was detailed in the previous paragraphs, for every parity-group member sent to a given server in the Ingestion Phase of operation, that server places the resulting DHT objects within the JTG and proceeds to issue and commits that JTG. Once the server has committed the JTG, the client learns of this and marks that portion of the Parity Group put as complete. Once the client has received notice from each server involved in the storing of the parity group, the client may free buffers composing that group.

Extent Descriptor Update instructions are sent to the pool peers responsible for mapping the data space regions under which the respective extents fall.

Extent Descriptor Updates (Extdesc_Update)

The extents' descriptors, i.e., metadata, describe, the contents of each fragment (extent) which the subject IME's BB tier receives from the clients. Each extent descriptor contains the offset of the fragment in the file in bytes, the length of the fragment in bytes, the location where the fragment is stored in a non-volatile memory (NVM), and the state of the fragment.

There are two types of IME local extents and foreign extents: (a) Local extents refer to a fragment data that is stored on the same physical node that is the owner or is responsible for that particular section of the file; and (b) Foreign extents refer to fragment metadata (on the node that owns that part of the file) for data stored on another node that does not have ownership of that section of the file. This happens when a client sends the data to the wrong node because the correct owner is unavailable or busy.

When clients make "read" requests to the system for a given extent of data, the FID and offset tuple will hash to a specific set of nodes which are responsible for maintaining the extent descriptors associated with the requested data. Therefore, when an I/O server ingests a block, it must notify the pool peers to which the extents (or fragments) within the block map so that those peers may present a consistent view of the data space.

Extdesc_update commands require the PGID for mapping back to the PGI structure so that garbage collection process may occur in line with the replay process.

Additionally, the PGID is used to fetch fault tolerance information in the case of a "read" failure. As one would expect, extent descriptor updates are managed alongside parity group information updates. In fact, some their parameters may be analogous. For instance, the fragment count sent in PGI_update routine (which was detailed in previous paragraphs) directly corresponds to the number of extent updates issued within a single logical extdesc_update command.

Replay of Cached Data to the Backing Filesystem

Referring to FIG. 1, the replay of data in IME is performed by the I/O nodes 38 in the BB tier 40 to which extents (fragments) 96 have been assigned via the global hashing mechanism 54. Data is not necessarily replayed by the I/O nodes which have stored the data in their local NVM 42, but may be fetched over the network to be replayed into the BFS 18 by the node assigned to the respective data region.

The IME system 10 also has the unique capability of providing fault tolerant replay. For instance, if an I/O node in the BB tier 40 has failed, only the failed node likely contain non-replayed or dirty extents, but it is also likely responsible for the replay of its designated segments. To deal with such failures, the subject IME system provides means for redundant replay processing where I/O nodes in the BB tier 40 are assigned as replay alternates for some portion of the data space. In fact, a single failed node's replay workload will be evenly dispersed amongst the remaining nodes in that pool. So in the event of a failure or even an oversubscribed node, other nodes will step in to manage the replay processes.

Replay Status Instruction

The Replay Status Instruction (RSI) is used for communicating the replay state of a file object region to pool peers which are designated as replay execution alternates for the region.

File object regions are large aligned contiguous portions of a file, the size of which is tailored for the underlying Parallel Filesystem. If a node acting as a replay execution alternate is not notified within some time threshold, that node will assume the replay duties for itself.

Because the extent descriptors are transactionally replicated amongst the primary and the replay execution alternate, the replay execution alternate has a consistent view of the outstanding replay workload. Given this, RSI messages are employed for two purposes: (a) notifying the replay execution alternates that the replay activity has been completed, or (b) is delayed. When the alternate replay nodes receive RSI messages they either reset or disable the timer associated with the bucket.

The IME divides up a file into chunks (or buckets) of equal size, and assigns responsibility for each chunk (or bucket) to a specific node based on the hashing algorithm. The chunks (or buckets) of a file are sequential. The bucket number identifies each one in a file and is used with the hashing algorithm to determine which node owns it. Each extent (or fragment) in the system, called the extent bucket number, must be assigned to a single bucket.

RSIs require the FID, the operations type (disarm or delay), the extent bucket number, and the highest TXID (transaction identifier) contained in the replay I/O. The TXIDs are used to guarantee a correct order of events in the system. The subject IME system may use, for example, Lamport timestamps for the TXID. The highest TXID is used to ensure that replay timer management is handled correctly in the face of simultaneous writes and replays.

Global transaction numbers are being used in the subject system to identify the extents which have been involved in the replay operation. It should be recognized that a potential race condition exists between incoming "writes" to a bucket and the replay of that bucket. Should such a race occur, the replay alternate nodes will not be certain of the extents included in the replay operation. This is because the pool members may issue JTGs with an equal or a lesser TXID that what is currently manifested in the bucket. Alleviating this problem requires that buckets containing TXID's close to transactional event horizon are avoided for some time. In other words, the replay of the bucket is delayed until the transactional state of the pool settles and a minimum TXID can be established.

The point, at which the replay operation may occur, is determined by analyzing a Global Transaction Progress Table. Replay of a given bucket may not occur until every peer's last committed TXID is greater than the highest TXID contained in the replay operation. This ensures that the RSI will access the same set of extents within the specified bucket, on the primary replay node and its replay execution alternates. Utilizing this method obviates the need to explicitly specify which extents have been replayed in any single "write" operation to the BFS.

Extent Replay Completion Instruction

The extent replay completion instruction (ERCI) is primarily used for the garbage collection phase of Parity Groups. ERCIs are sent to the authoritative parity group information holders. These instructions serve to decrement the reference counts held in the PGI on behalf of the replayed extents. ERCIs are composed of the PGID and the Parity-Group block number in which the extent resides. Note that one ERCI is delivered on behalf of each extent involved in the replay operation. Therefore, in highly fragmented scenarios it's possible for a large number of ERCIs to be generated on behalf of a single replay operation.

Extent Replay

The Replay Engine 117, shown in FIGS. 1, 2, and 5A-5C, is detailed in accordance with a routine presented in FIG. 8. In a simplified form, the Replay procedure may be presented in conjunction with FIG. 5C.

As shown in FIG. 5C, during the Replay Phase of operation, unrelated data fragments stored in the nodes of the BB tier 40, are aggregated by the Restructuring Aggregating Mechanism 48 into orderly files (also referred to herein as buffers) subsequently to be written into the BFS 18.

During this process, the Data Generating Entity (Compute Node) 12 determines which one (or a number) of the I/O nodes in the BB tier 40 contain(s) the data fragments needed for configuring the file in question for writing, in orderly fashion, into the BFS 18. The needed data fragments then are fetched from one (or several) I/O nodes, and the aggregation mechanism 48 aggregates them into respective files (buffers).

For example, in order to form a local (object) file, the data fragments 96a and 96b, both local to the same I/O node, are fetched and aggregated into the local file 170.

In another example, in order to form a pool-local (object) file, the data fragments 96c, 96d, and 96e, residing in different nodes of the same pool $60_1$, are fetched and aggregated into a Pool-local file 172.

In an alternative example, if a pool-global (object) file is to be formed, the data fragments 96f, 96g, 96h, 96i, 96j, 96k, 96l, 96m, and 96n, residing in I/O nodes in different pools $60_1, 60_2, \ldots 60_M$ are aggregated by the Aggregation Mechanism 48 into a Pool-Global file 174 which is subsequently written into the BFS.

During the Replay and Aggregation processes, the changes in the state of the data fragments, data blocks, parity blocks, each pool, as well as all pools are reflected by the Residency References Counter 120, as has been detailed in previous paragraphs.

Referring now to FIG. 8, the replay phase is initiated in step 200, where a read extent is read from the DHT.

An extent is further checked in logic block 210 to determine if it needs to be replayed. It may not need to be replayed if the fragment data for the extent was overwritten by a subsequent "write", or the file was deleted or truncated. If the data does not need to be replayed, then an ERCI is sent to the authoritative parity group information holders in step 330. If the data does need to be replayed then the extent is checked in logic block 220 to determine if it is local or remote.

For a local extent (local to an authoritative node), the logic passes to step 230, and the data for the extent is read from the local NVM. If, however, it is determined in logic block 220, that the extent in question is a remote (foreign or other than the authoritative node in the same pool) extent, then a message is sent to the remote node that holds the data. In step 240, the id of the remote node that holds that data is found within the PGI.

The procedure further follows to logic block 250, where the determination is made whether the server holding the data in question is available.

If in logic block 250, the data is available, the data from foreign servers is fetched in step 260, and the logic passes to logic block 270.

If the data is not available (because it is invalid in the local or remote NVM, or the remote NVM is not available) then the data must be reconstructed. For reconstruction, the logic flows to step 280 to read PGI data from DHT, and further advances to step 290 to acquire a list of nodes in the pool that contain the full data blocks and parity data block(s) for this PGI, and the bulk data and parity data that was striped across the nodes that are part of the PGI are read from other I/O nodes in the pool containing them in step 300.

After all of the data for the data for the stripe is transferred, then the node performing the replay reconstructs the missing data (in step 310) using the erasure coding information from the PGI.

After the extent data (received either from a local I/O server or from a foreign I/O server) is validated in logic block 270, and is ready for replay, it is written to the Backing File System in step 320. Subsequently, an ERCI is sent to the authoritative parity group information holders in step 330. Upon receiving the ERCI, the authoritative parity group information holders update the reference counts for the PGI (as shown in FIGS. 5A-5B).

Subsequently, if it is determined in logic block 340, that the reference count reaches zero, then the PGI is ready for garbage collection, and the garbage collection phase (detailed in FIG. 9) is initiated in step 350.

However, the reference count is not zero, as determined in logic block 340, the replay phase terminates.

If in logic block 270, the extent data is not validated, then logic flows to step 280 for data reconstruction, as detailed in previous paragraphs.

Post-Replay Garbage Collection

Fragments may be no longer reachable from the user's view because they have been overwritten by other valid fragments, but they need to be kept if they are part of a PGI. During the garbage collection phase, the subject system needs to ensure that all of the valid fragments in a PGI have been replayed before the PGI is deallocated. Garbage collection algorithms have the task of identifying the objects that are reachable (i.e., the objects which can be accessed by the system in its current state) and reclaiming the space occupied by unreachable objects.

Garbage collection is performed in present system on the basis of a parity group as opposed to a per-object or per-region basis as customary for other garbage collection algorithms. This is doable due to the fault tolerance technique employed in the subject system which allows for fault tolerant block groupings to be composed of ad hoc fragments belonging to any single file object. Therefore in the subject IME system, the authoritative PGI structure is the lynchpin for the garbage collection procedure because it maintains the residency state of the parity group members, as well as their replay status.

As discussed in the previous paragraphs, the PGI_create and PGI_update instructions initialize and compose PGIs with residency and fragment count information. After the replay phase has occurred, ERCIs decrement the parity block reference counts, as shown in FIGS. 5A-5B. When each of the parity block references have reached zero (in the Residency Reference Counter 120), the authoritative nodes PGIa are free to initiate garbage collection of the parity group. Alternatively, if the file object's extents are pinned in the cache, then garbage collection will be initiated upon release of the pin and not necessarily after the replay phase completion.

The fault tolerance model dictates that the parity group may not be freed until each of its members has been replayed or otherwise deemed unnecessary.

The Garbage Collection Engine 119 is shown in FIGS. 1 and 5B, and the garbage collection routine (step 350 of FIG. 8) represented by a flow-chart diagram underlying the PGI garbage collection process is detailed in FIG. 9.

As shown in FIG. 9, the authoritative parity group information holder starts the PGI garbage collection phase by reading in (from an authoritative PGI) the list of nodes that the PGI data is stripped across in step 400. Subsequently to step 400, a "deallocate PGI" message is sent to all other nodes, i.e., the other nodes in the pool that are part of the authoritative PGI in question.

The "deallocate PGI" message is a type of operation to perform on a PGI (Parity Group Information). The "deallocate PGI" message is a request from a node that has data (which is part of the PGI) to deallocate the PGI because that node has flushed the data during the replay phase, and thus no longer needs to have the data parity protected. The PGI is deallocated when all of the data in the PGI has been flushed to the backing filesystem.

At the other PGI peer (member) nodes side, when the PGI peer nodes in the pool receive the "deallocate PGI" message in step 420, they start the local PGI deallocation. For the PGI deallocation procedure routine, the logic flows to step 430, where the PGI descriptor is removed from the DHT. This prevents other nodes access to the PGI during the deallocation.

Subsequently, the routine passes to logic block 440 where the decision is made whether the authoritative node possesses any extents. If no extents are found in the authoritative node, the logic passes to step 490 to deallocate the local PGI in question. Any error encountered (during the small window when the PGI is not available) will cause the data to be loaded from the Backing File System since it was already replayed in the replay phase of operation.

If it is decided in logic block 440 that the authoritative node has extents, the PGI member nodes begin reading the extent list from the PGI in step 450, and the procedure flows to logic block 460.

When it is decided in logic block 460 that the remaining extents are still residing in the PGI, the logic flows to step 480. Otherwise, each extent in the list is removed from the DHT in step 470. At this point, the data is no longer available from the PGI member node, so any subsequent reads for the data will require it to be loaded from the Backing File System.

After all of the extents are removed from the DHT, as decided in logic block 460, the PGI member node can free the space in the NVM that is being used for the PGI bulk data in step 480. Alternatively, if the file object's extents are pinned in the cache then garbage collection will be initiated upon release of the pin and not after replay completion. After all of the extents and bulk data have been removed, the PGI is no longer valid and is deallocated in step 490.

If the authoritative node also has data from PGI (as determined in logic block 440), then it will perform the same procedure to remove its local extents and PGI from the DHT in block 470 and remove the bulk data from the local NVM in block 480. If a PGI member node is an unauthoritative node (but does not have any of the bulk data) then it removes the PGI from the DHT in step 430 and deallocates it in step 490.

Client Read

Figure 10:
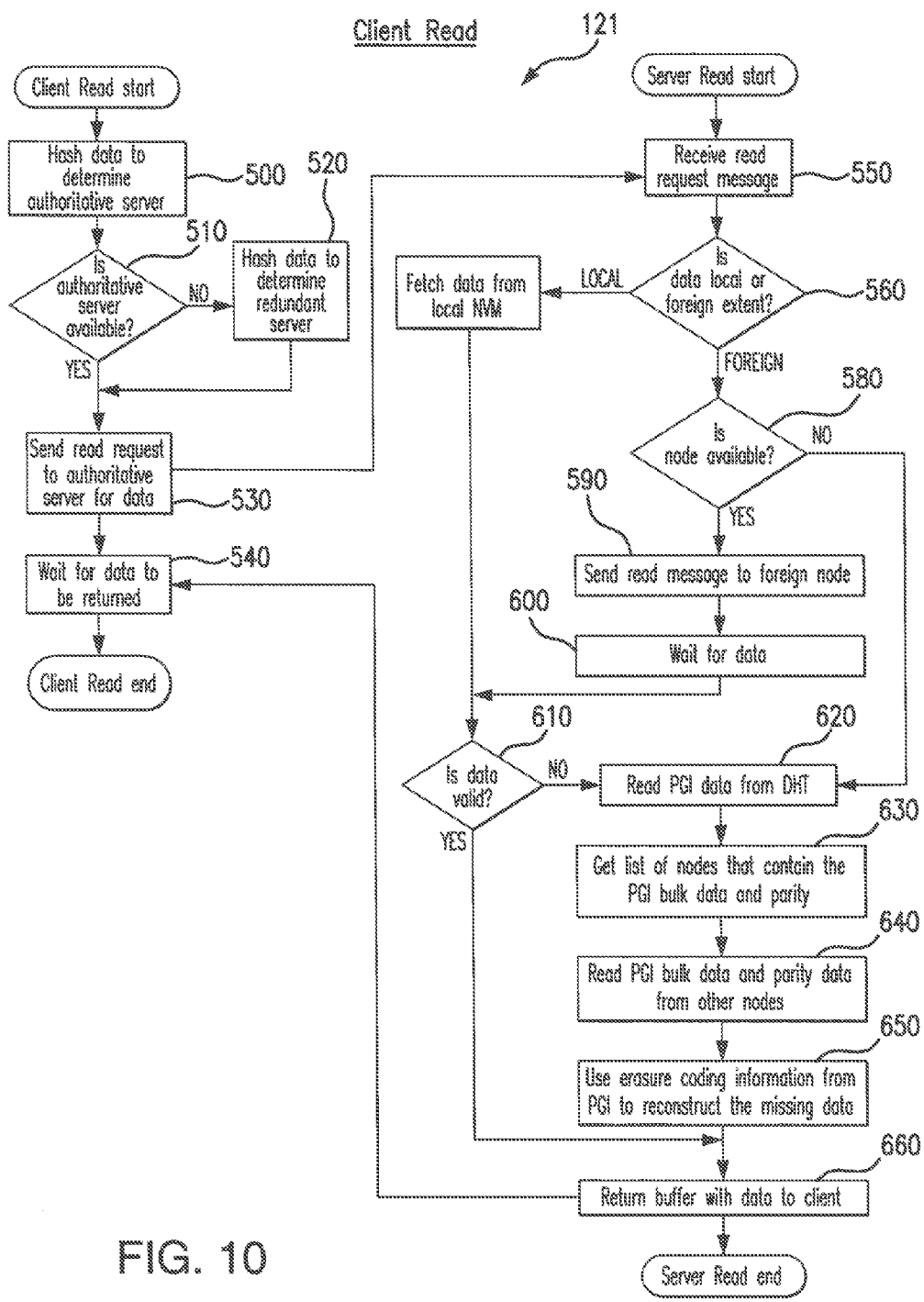
FIG. 10 is a flow-chart diagram reflecting the routine of servicing a "read" request from the client in the present data storage system.

In one of the modes of operation, a Client Read routine may be performed in the subject system, as shown in FIGS. 1 and 10. The client read routine 121 is similar to the replay routine 117 except that the data is returned to the client and no ERCIs are sent out.

As shown in FIG. 10, the Client Read procedure 121 is initiated in step 500 by hashing (by the client) the data to determine the authoritative server for the data. If it is decided in logic block 510 that the authoritative server for the data is not available, then the hash is repeated in step 520 to find a redundant authoritative server for the data.

If the authoritative server is available, the client sends a "read" request to the authoritative server for the data in step 530.

The Authoritative server receives the client "read" request in step 550. The server checks in logic block 560 if the data is local or a foreign (i.e., resides in another node of the same pool). If it is local, then the data is fetched from the local NVM in step 570. If the data is foreign (resides at another node), then a message is sent from the authoritative server to the foreign I/O node to send the data to the authoritative server.

If in logic block 580, it is decided that the data is invalid or the server that holds the data is not available, then the authoritative server in step 620 reads the PGI data from the DHT and obtains a list of all the nodes that hold data that is part of the PGI stripe in step 630.

Subsequently, in step 640, the authoritative server sends read requests to the other nodes in the list and waits for the data to be returned.

Subsequently, when the data has been returned, the authoritative server reconstructs, in step 650, the missing or invalid data from the stripe data and the erasure coding information contained in the PGI. The reconstructed data is then returned to the client in step 660.

Subsequently to step 570, the logic decides in logic block 610 if the data fetched from the local NVM is valid. If the data is valid, the procedure follows to step 660, so that the buffer with the requested data is returned to the client.

If, however, in logic block 610, it is decided that the data is invalid, the logic flows to block 620 to start the reconstruction routine (steps 620-650), and the buffer with the reconstructed data is subsequently returned to the client in step 660.

If in the logic block 580, it is decided that the data is valid, a "read" message is sent by the authoritative server to the foreign node (pool member node) in step 590, and waits for data in step 600. Subsequently to receipt of the requested data from the foreign node, the process flows to logic block 610 for checking the data validity as detailed in previous paragraphs.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

What is being claimed is:

1. A method for data migration between data generating entities and a File System in a data storage system, comprising:
   (a) operatively coupling a Burst Buffer (BB) tier between at least one data generating entity and the File System, and configuring said BB tier with a plurality of Burst Buffer Nodes (BBNs) and a plurality of Non-Volatile Memory (NVM) units, wherein each NVM unit is operatively associated with a respective BBN of said plurality thereof;
   (b) arranging said plurality of BBNs and NVMs associated therewith in a plurality of storage pools, with each of said plurality of pools being formed of a respective group of BBNs peers and NVMs associated therewith;
   (c) composing, by said at least one data generating entity, at least one Parity Group structure containing a plurality of data blocks $BBB_1$, $BBB_2$, ..., and $BBB_n$, and at least one parity block $BBB_p$, wherein each of said plurality of data blocks is filled with respective unstructured data fragments and a metadata section addressing said respective unstructured data fragments, and wherein said at least one parity block contains error correction coded said respective data fragments and said metadata;

(d) storing said at least one Parity Group structure in a respective one of said plurality of storage pools, with each one of said data blocks $BBB_1$, $BBB_2$, ..., and $BBB_n$, and said at least one parity block $BBB_p$ stored at a respective Burst Buffer Node of said plurality of BBNs constituting said respective storage pool;

(e) generating, by one of said plurality of BBNs in said respective storage pool, a Parity Group Identifier (PGID) for said at least one Parity Group structure and a Parity Group Information (PGI) structure for said at least one Parity Group, wherein said PGID includes information on said PGI structure's residency in said BB tier, and wherein said PGI structure includes information addressing each of said data blocks and parity blocks in said respective storage pool; and (f) replaying at least one data fragment from said respective storage pool to said File System by an assigned respective one of said BBNs in said respective storage pool through performing the operations of:

(g) if said at least one data fragment is to be replayed, determining, using said PGID and said PGI, whether said at least one data fragment resides at an NVM unit local to said assigned respective BBN, and reading said data fragment from said local NVM unit if said at least one fragment is found at said local NVM, if said at least one data fragment resides in said respective storage pool in a BBN other than said assigned respective BBN, sending by said assigned respective BBN, a message to said other BBN, thus requesting said at least one data fragment therefrom, and if said other BBN is available, fetching said at least one fragment from the NVM unit local to said other BBN;

(h) validating said at least one data fragment; and (i) writing said at least one data fragment to the File System.

2. The method of claim 1, further performing the operation of:

after said operation (i), sending a replay completion instruction for said at least one data fragment to an authoritative node of said BBNs holding said PGI, and decrementing, by said authoritative node, a reference count for said PGI.

3. The method of claim 2, wherein, when said decremented reference count reaching zero, performing a garbage collection procedure.

4. The method of claim 3, further comprising:

(j) if in said operation (g), said other BBN is not available, reconstructing said at least one data fragment using bulk data and parity data of said at least one Parity Group structure striped across said BBNs located in said respective storage pool using said PGI.

5. The method of claim 4, further comprising:

in said operation (a), operatively coupling a Distributed Hash Table (DHT) server to said BB tier, wherein said DHT server includes a plurality of DHT portions, each DHT portion being maintained by a respective one of said plurality of BBNs, and writing at least one DHT object in a corresponding one of said DHT portions, wherein said each DHT object includes said PGI and metadata associated with a corresponding one of said at least one Parity Group's blocks $BBB_0$, $BBB_1$, ..., $BBB_n$, and $BBB_p$.

6. The method of claim 5, further comprising in said operation (j), performing sequentially:

reading said PGI data from said DHT server, obtaining, from said PGI data, a list of BBNs containing said bulk data and parity data of said at least one Parity Group structure and erasure coding information, and using the erasure coding information, reconstructing said at least one data fragment.

7. The method of claim 5, further comprising:

in said operation (a), coupling a Residency Reference Counts Structure to said BB tier to indicate the number of active references to said at least one DHT object, and after said operation (i), decrementing said Residency Reference Counts Structure for said at least one data fragment replayed from said BB tier to said File System.

8. The method of claim 7, further comprising:

forming said Residency Reference Counts Structure with a Local Object Counter for counting residency references to data fragments local to nodes BBNs in said respective storage pool, a Pool-Local Object Counter for counting residency references to objects local to said respective storage pool, and a Pool-Global Object Counter for counting residency references to objects global to said plurality of said storage pools in said BB tier.

9. The method of claim 8, configuring said Pool-Local Object Counter as a bitmap representing said nodes BBNs of said at least one Parity Group structure, wherein during said replay operation, upon replaying said at least data fragment, decrementing said Local Object Counter until the residency reference count of said data fragments for a respective data block of said at least one Parity Group reaches zero when said respective data block is replayed to said File System, and clearing a residency reference bit associated with said respective data block in said Pool-Local Object Counter's bitmap.

10. The method of claim 9, further comprising:

configuring said Pool-Global Object Counter as a Bit Field representing said plurality of storage pools in said BB tier, wherein during said replay operation, upon replaying of said at least one respective data block to said File System, decrementing said Pool-Local Object Counter until the residency reference count of said blocks $BBB_0$, $BBB_1$, ..., and $BBB_n$, and $BBB_p$ for said respective storage pool reaches zero when said at least one Parity Group is replayed to said File System, and clearing a residency reference bit associated with said respective pool in said Pool-Global Object Counter's Bit Field.

11. The method of claim 5, further comprising:

in said operation (f), acquiring, by at least one of said BBNs, the metadata stored in said DHT server portion associated with said at least one of said BBNs, reading said data fragments from a respective data block written in said at least one of said BBNs, aggregating said data fragments, storing said aggregated data fragments in a respective buffer in a structured format in accordance with said metadata, thereby forming a respective structured data file, and once said respective buffer is full, committing said respective structured data file to said File System, wherein said respective structured data file is selected from a group including at least one node-local object, at least one pool-local object and at least one pool-global object.

12. The method of claim 11, further comprising:
  if in said operation (f), during the replay of said at least one data fragment, data migration experiences a faulty condition, using said PGI to indicate the Parity Group's blocks needed for said at least one data fragment reconstruction.

13. The method of claim 9, further comprising:
  when said Residency Reference Counts Structure reaches zero for all said blocks $BBB_1$, $BBB_2$, ..., $BBB_n$, and $BBB_p$ of said Parity Group, deleting said PGI from said BBNs.

14. The method of claim 9, further configuring said Local Object Counter for counting references to objects local to said BBNs,
  configuring said Pool-Local Object Counter for counting references to objects local to said respective pool, and
  configuring said Pool-Global Object Counter for counting references to objects spanning across a plurality of pool in said BB tier.

15. The method of claim 14, wherein at least one object local to said BBNs includes a data fragment descriptor created on a BBN receiving said data fragment and cleared when said data fragment is replayed,
  wherein at least one object local to said respective pool includes said PGI for said at least one Parity Group, said POI being created on an authoritative node of said BBNs and cleared when each data fragment on each of said BBNs is replayed, and
  wherein at least one object global to said storage pools in said BB tier includes a global file descriptor created with a plurality of pool file descriptors and closed when all pool file descriptors report the removal thereof to said global file descriptor.

16. The method of claim 15, further comprising the operation of unreferencing said at least one Pool-Global Object, when said Residency Reference Counts Structure reaches zero for said plurality of storage pools in said BB tier.

17. The method of claim 5, further comprising:
  performing garbage collection routine on the basis of said at least one Parity Group structure using the residency state and the replay status of said at least one data fragment.

18. The method of claim 15, further comprising the sequence of operations, including:
  reading, by an authoritative one of said BBNs in said respective storage pool, a list of BBNs holding said at least one Parity Group structure's bulk data and parity data,
  sending, by said authoritative BBN, a PGI deallocate message to BBNs other than said authoritative BBN in said respective pool,
  upon receipt of said PGI deallocate message, removing said PGI descriptor from said DHT server, and
  reading, by said other BBNs, the data fragments list from the PGI with subsequent removal of said data fragments from said DHT server, and
  freeing the memory space in the NVM associated with said other BBNs.

19. The method of claim 18, further comprising:
  removing said data fragments and PGI remaining in said authoritative node from the DHT server, and
  removing the bulk data from the NVM unit associated with said authoritative node.

20. A method for data migration between data generating entities and a File System in a data storage system, comprising:
  (a) operatively coupling a Burst Buffer (BB) tier between at least one data generating entity and the File System, and configuring said BB tier with a plurality of Burst Buffer Nodes (BBNs) and a plurality of Non-Volatile Memory (NVM) units, wherein each NVM unit is operatively associated with a respective BBN of said plurality thereof;
  (b) arranging said plurality of BBNs and NVMs associated therewith in a plurality of storage pools, with each of said plurality of pools being formed of a respective group of BBNs peers and NVMs associated therewith,
  (c) composing, by said at least one data generating entity, at least one Parity Group structure containing a plurality of data blocks $BBB_1$, $BBB_2$, ..., and $BBB_n$, and at least one parity block $BBB_p$, wherein each of said plurality of data blocks is filled with respective unstructured data fragments and a metadata section addressing said respective unstructured data fragments, and wherein said at least one parity block contains error correction coded said respective data fragments and said metadata;
  (d) storing said at least one Parity Group structure in a respective one of said plurality of storage pools, with each one of said data blocks $BBB_1$, $BBB_2$, ..., and $BBB_n$, and said at least one parity block $BBB_p$, stored at a respective Burst Buffer Node of said plurality of BBNs constituting said respective storage,
  (e) generating, by one of said plurality of BBNs in said respective storage pool, a Parity Group Identifier (PG ID) for said at least one Parity Group structure and a Parity Group Information (PGI) structure for said at least one Parity Group, wherein said PGID includes information on said PGI's residency in said BB tier, and wherein said PGI includes information addressing each of said data and parity blocks in said respective storage, pool, and
  (f) determining, by said at least one data generating entity, an authoritative node for a requested data, and issuing a READ request to said authoritative node;
  (g) at said authoritative node, checking whether the requested data is local to said authoritative node; and
  (h) if the requested data is local to said authoritative node, fetching the requested data from the NVM unit local thereto;
  (i) validating said fetched data; and
  (j) returning said requested data to said at least one data generating entity.

21. The method of claim 20, further comprising:
  if in said operation (g), it is determined that the requested data is held in another node than the authoritative node,
  sending, by said authoritative node, the message to said another node for said requested data and waiting for said requested data,
  receiving the requested data from said another node to said authoritative node,
  determining, in said operation (i), whether said requested data received from said another node is valid, and
  if valid, returning said requested data to said data generating entity.

22. The method of claim 21, further comprising:
  if in said step (i), it is determined that the data is invalid or said another node is unavailable, reading, by said authoritative node, the PGI data, and
  obtaining therefrom a list of BBNs containing bulk data and parity data of said at least one Parity Group,
  reading said bulk data and parity data from said BBNs,
  using the erasure coding information from said PGI, reconstructing said invalid requested data, and returning said reconstructed requested data to said at least one data generating entity.

23. A system for data migration between data generating entities and a File System, comprising:
- a Burst Buffer (BB) tier operatively coupled between at least one data generating entity and the File System, and configured with a plurality of Burst Buffer Nodes (BBNs) and a plurality of Non-Volatile Memory (NVM) units, wherein each NVM unit is operatively associated with a respective BBN of said plurality thereof, and wherein said plurality of BBNs are arranged in a plurality of storage pools, said at least one data generating entity having at least one parity group buffer and being configured to compose at least one Parity Group to be ingested in a respective one of said plurality of storage pools in said BB tier,
- a Parity Group Ingestion mechanism operatively coupled between said at least one data generating entity and said BB tier,
- a Parity Group Replay Engine operatively coupled between said BB tier and the File System, and
- an Addressing Mechanism operatively coupled to said at least one data generating entity, said BB tier, said Parity Group Ingestion mechanism, said Parity Group Replay Engine, and said File System;

wherein said Parity Group includes:
- a plurality of data blocks $BBB_1, BBB_2, \ldots, BBB_n$, each of said data blocks $BBB_1, BBB_2, \ldots, BBB_n$, being filled with corresponding unstructured data fragments and containing metadata associated with said corresponding data fragments, and
- at least one parity block $BBB_p$ containing error correction coded data fragments contained in said data blocks $BBB_1, BBB_2, \ldots,$ and $BBB_n$, and
- wherein said data blocks $BBB_1, BBB_2, \ldots, BBB_2,$ and $BBB_p$ share said respective storage pool affinity;

wherein said Parity Group Ingestion mechanism is configured to operatively cooperate with said Addressing mechanism to generate a Parity Group Information (PGI) structure containing information for said at least one Parity Group residency and replay status, and a Parity Group Identifier (PGID) containing information on a residency of said PGI;
a Distributed Hash Table (DHT) server operatively coupled to said BB tier, wherein said DHT server includes a plurality of DHT portions, each DHT portion being maintained by a respective one of said plurality of BBNs,
said DHT server being configured to store at least one DHT object in a corresponding DHT portion, wherein said at least one DHT object includes said metadata and said PGI associated with a corresponding one of said, $BBB_1$, $BBB_2, \ldots, BBB_n$, and $BBB_p$,
wherein said Parity Group Replay Engine is configured to acquire, during a Replay Phase of operation, a metadata stored in said corresponding DHT portion associated with said at least one BBN, to read said data fragments from said data block written in said at least one BBN, to store said data fragments in a respective buffer in a structured format in accordance with said metadata, and to write said structured data fragments in said File System, once said respective buffer is full, and
wherein during the Replay Phase of operation, said system is configured to use said PGI structure to indicate said at least one Parity Group's data blocks and parity block needed for data reconstruction if data migration experiences faulty conditions.

24. The system of claim 23, further including:
- a Jumbo Transaction group (JTG) structure created in the memory of said DHT server, wherein said JTG structure holds a list of commands that mutate said DHT server's portions, and
- wherein said at least one DHT object is placed in said JTG structure associated with said corresponding BBN.

25. The system of claim 23, wherein said PGID resides in a metadata section within said NVM associated with said respective BBN.

26. The system of claim 23, further including:
- a Residency Reference Counts Structure coupled to said BB tier to indicate the number of active references to said at least one DHT object, wherein said Residency Reference Counts Structure is configured to cooperate with said Parity Group Replay Engine to decrement count for said data fragments removed from said corresponding block during replay operation.

27. The system of claim 26, wherein said Residency Reference Counts Structure is configured with a Node-Local Object Counter, a Pool-Local Object Counter, and a Pool-Global object counter,
wherein said Pool-Local Object Counter is configured as a bitmap with each bit representing a respective one of said blocks in said at least one Parity Group, and
wherein said Pool-Global Object Counter is configured as a bit field with each bit corresponding to a respective one of said plurality of storage pools in the BB tier, and
wherein said Local Object Counter transmits to said Pool-Local Object Counter the counts changes for references to objects local to said BBNs, and
wherein said Pool-Local Object Counter transmits to said Pool-Global Object Counter the counts changes for references to objects local to at least one respective pool of said plurality thereof.

28. The system of claim 23, wherein said Residency Reference Count Structure is configured to cooperate with said Parity Group Replay Engine to decrement counts of the references for said data blocks and said parity block of said Parity Group till the reference count reaches zero in said Replay Phase of operation when said data fragments from said data blocks and parity block are replayed to the File System, and
to clear the residency reference bit associated with said Parity Group in said PGI's bitmap.

29. The system of claim 28, further configured to delete said PGI from said BBNs when the residency reference counts reach zero for all said blocks, $BBB_1, BBB_2, \ldots, BBB_n$, and $BBB_p$ of said at least one Parity Group.

* * * * *